US006757073B1

(12) United States Patent
Kuroda

(10) Patent No.: US 6,757,073 B1
(45) Date of Patent: Jun. 29, 2004

(54) DATA PROCESSING HAVING PAGE LAYOUT FUNCTION

(75) Inventor: Shigeki Kuroda, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/258,197

(22) Filed: Feb. 26, 1999

(30) Foreign Application Priority Data

Feb. 27, 1998 (JP) .......................................... 10-047451

(51) Int. Cl.$^7$ ............................................. G06F 15/00
(52) U.S. Cl. ........................ 358/1.2; 358/1.9; 358/1.13; 358/1.16
(58) Field of Search ......................... 358/1.2, 1.9, 1.13, 358/1.16, 1.17, 1.18, 1.15, 298, 449; 400/76, 70, 61; 707/517, 520, 522, 523, 525, 515; 399/204, 368

(56) References Cited

U.S. PATENT DOCUMENTS 5,146,343 A * 9/1992 Fujii ........................... 358/296
5,191,429 A * 3/1993 Rourke ....................... 358/449
5,495,561 A * 2/1996 Holt ........................... 358/1.15
6,188,490 B1 * 2/2001 Miyake ....................... 358/1.18

* cited by examiner

Primary Examiner—Twyler Lamb
(74) Attorney, Agent, or Firm—Fitzpatrick, Cella, Harper & Scinto

(57) ABSTRACT

A data processing apparatus which transmits print data to a print apparatus through a specific communication medium is capable of generating intermediate data different in data form from the print data before generating the print data. The apparatus provisionally retains the intermediate data and generates the print data from the intermediate data. The apparatus records logical page information for the print data to be transmitted to the print apparatus when the intermediate data is generated and provisionally retained, edits the intermediate data having a predetermined page layout number or a page number different from the layout page number in accordance with a designated print mode and the logical page information recorded. The apparatus generates the print data that is analyzable by the print apparatus in accordance with the intermediate data edited, and outputs the generated print data to the print apparatus.

48 Claims, 15 Drawing Sheets

FD 8

RAM 12

FIG. 6

"JOB START COMMAND" PRINTER INITIALIZATION COMMAND ("PAPER SIZE DESIGNATION COMMAND" "PRINT DIRECTION DESIGNATION COMMAND" ...) DRAW COMMAND ("CHR PRINT COMMAND" "COLOR DESIGNATION COMMAND" "FIGURE DRAW COMMAND" "IMAGE DRAW COMMAND" "NEW PAGE COMMAND" ...... "COLOR DESIGNATION COMMAND" "CHR PRINT COMMAND" ...... "CHR PRINT COMMAND" "CHR PRINT COMMAND" ...... "NEW PAGE COMMAND" ...... "FIGURE DRAW COMMAND" ...... "COLOR DESIGNATION COMMAND" "CHR PRINT COMMAND" ...... "COLOR DESIGNATION COMMAND" "FIGURE DRAW COMMAND" ...... "NEW PAGE COMMAND" ...... "COLOR DESIGNATION COMMAND" "CHR PRINT COMMAND" ...... "IMAGE DRAW COMMAND" ...... "COLOR DESIGNATION COMMAND" "CHR PRINT COMMAND" ...... "NEW PAGE COMMAND" ...... "CHR PRINT COMMAND" ......) "JOB END COMMAND"

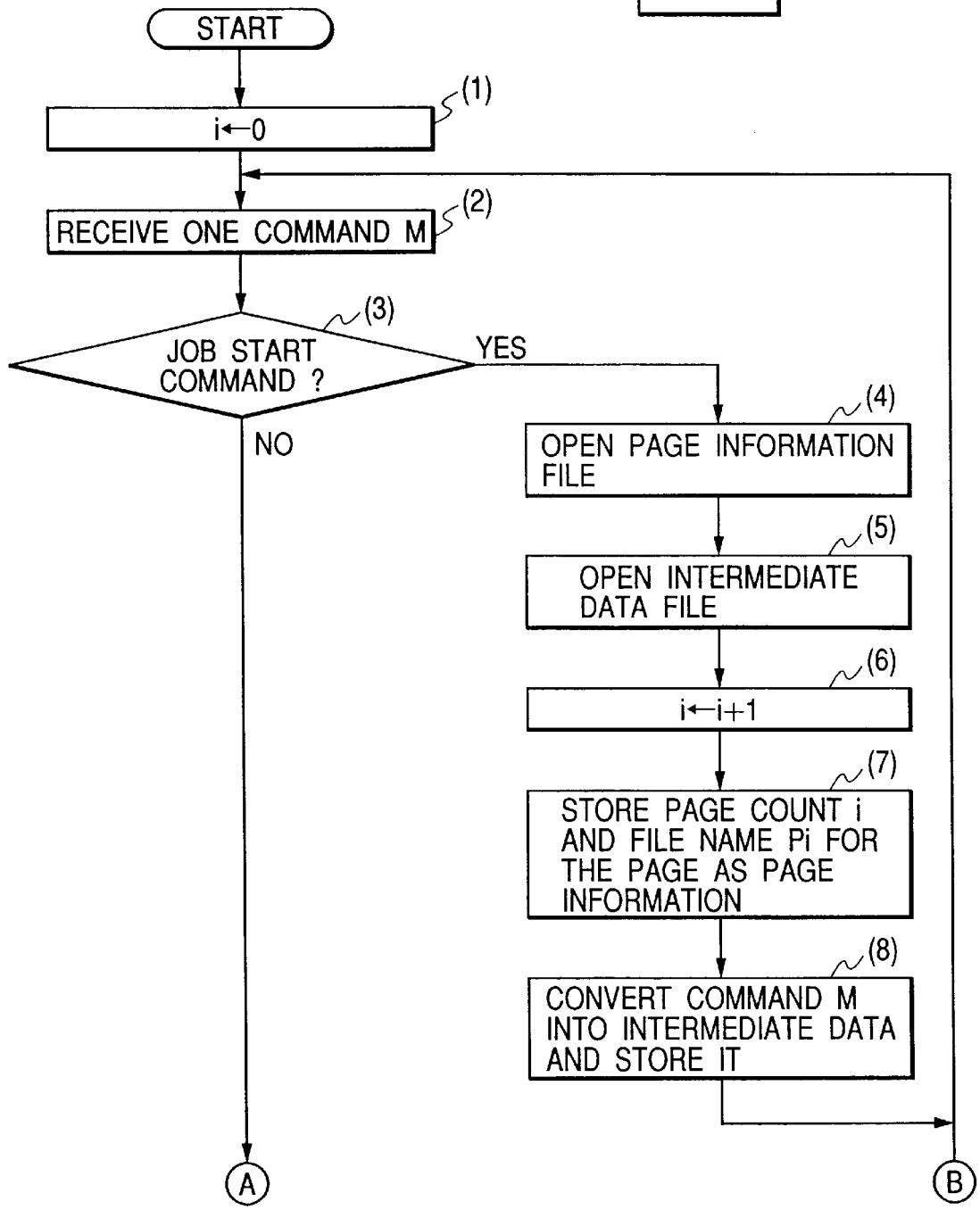

PAGE INFORMATION FILE    INTERMEDIATE DATA FILE

LOGIC PAGE Li    PHYSICAL PAGE Fi (9-UP)

| N AS DESIGNATED | NO. OF PAGES I | OPTIMUM N |
|---|---|---|
| 2 | 1 | 1 |
| | 2 PAGES OR MORE | 2 |
| 4 | 1 | 1 |
| | 2 | 2 |
| | 3 PAGES OR MORE | 4 |
| 8 | 1 | 1 |
| | 2 | 2 |
| | 3, 4 | 4 |
| | 5 PAGES OR MORE | 8 |
| 9 | 1 | 1 |
| | 2 | 2 |
| | 3, 4 | 4 |
| | 5, 6, 7, 8 | 8 |
| | 9 PAGES OR MORE | 9 |
| 16 | 1 | 1 |
| | 2 | 2 |
| | 3, 4 | 4 |
| | 5, 6, 7, 8 | 8 |
| | 9 | 9 |
| | 10 PAGES OR MORE | 16 |

| N AS DESIGNATED | NO. OF PAGES I | OPTIMUM N |
|---|---|---|
| 2 | 1, 2 | 1 |
|   | 3 PAGES OR MORE | 2 |
| 4 | 1, 2 | 1 |
|   | 3, 4 | 2 |
|   | 5 PAGES OR MORE | 4 |
| 8 | 1, 2 | 1 |
|   | 3, 4 | 2 |
|   | 5, 6, 7, 8 | 4 |
|   | 9 PAGES OR MORE | 8 |
| 9 | 1, 2 | 1 |
|   | 3, 4 | 2 |
|   | 5, 6, 7, 8 | 4 |
|   | 9—16 | 8 |
|   | 17 PAGES OR MORE | 9 |
| 16 | 1, 2 | 1 |
|   | 3, 4 | 2 |
|   | 5, 6, 7, 8 | 4 |
|   | 9—16 | 8 |
|   | 17, 18 | 9 |
|   | 19 PAGES OR MORE | 16 |

| NO. OF PAGES I | OPTIMUM N |
|---|---|
| 1 | 1 |
| 2 | 2 |
| 3, 4 | 4 |
| 5, 6, 7, 8 | 8 |
| 9 | 9 |
| 10—16 | 16 |
| 17, 18 | 9 |
| 19 PAGES OR MORE | 16 |

| NO. OF PAGES I | OPTIMUM N |
|---|---|
| 1, 2 | 1 |
| 3, 4 | 2 |
| 5, 6, 7, 8 | 4 |
| 9 | 9 |
| 10—16 | 8 |
| 17, 18 | 9 |
| 19—32 | 16 |
| 33—36 | 9 |
| 37 PAGES OR MORE | 16 |

FIG. 17

MEMORY MAP OF FD/CD-ROM

| DIRECTORY |
|---|
| FIRST DATA PROCESSING PROGRAM PROGRAM CODES FOR STEPS OF FLOWCHART OF FIG. 4 |
| SECOND DATA PROCESSING PROGRAM PROGRAM CODES FOR STEPS OF FLOWCHART OF FIG. 7 |
| THIRD DATA PROCESSING PROGRAM PROGRAM CODES FOR STEPS OF FLOWCHART OF FIG. 10 |
| FOURTH DATA PROCESSING PROGRAM PROGRAM CODES FOR STEPS OF FLOWCHART OF FIG. 11 |
| FIFTH DATA PROCESSING PROGRAM PROGRAM CODES FOR STEPS OF FLOWCHART OF FIG. 13 |
| |

DATA PROCESSING HAVING PAGE LAYOUT FUNCTION

BACKGROUND OF THE INVENTION

1. Field of the Invention

The present invention relates to a data processing apparatus capable of generating the intermediate data in the data form which is different from the print data before generating the print data to be transmitted to a print apparatus through a specific communication medium, and also, capable of storing the intermediate data provisionally, and generating the print data from the intermediate data per unit of page. The invention also relates to a method for processing the print data for the data processing apparatus, as well as to a storage medium storing a program which is readable by a computer, and a data process program product.

2. Related Background Art

Conventionally, for a print apparatus (a printer) having the function to print per unit of page, and also, for the print process of the print system formed by the data processing apparatus, such as personal computer, which is connected with the printer, there has been known the page layout print (N-UP print) in which a plurality of pages (N pages) are reduced into one page layout (within one print sheet) as a print method that performs the page control.

The layout print is the print method which is suitable for curtailing the number of output sheets or for performing a draft printing, among some others. For example, it is possible to save the number of output sheets approximately by a half when performing the layout print (2 UP print) where two logical pages (two output pages from the application) are printed on one physical page (one output sheet).

Besides this page layout print, there are known, likewise, the 4 UP print where 4 logical pages are layout printed into one physical page, and the 8 UP print, the 9 UP print, the 16 UP print, and others. Also, it is known that the layout direction in one physical page can be made from the right to the left, from the top to the bottom, or the like. Further, for the implementation of this layout print, there is known a method in which the operator designates the page layout print mode, the number of the logical pages that should be layout printed on one physical page, and also, the layout direction when he designates the print mode of a document data or others by use of an information processing apparatus.

Also, it is known that once the page layout mode has been designated, such mode setting is effective until the designation is made afresh.

Further, for the printer which is provided with the function to perform the double-side print, it is known that if the double-side print execution mode is designated by use of the information processing apparatus, and if it is transmitted once to the printer, the double-side print is executed by the printer without the execution of any particular process made further on the information processing apparatus.

However, in accordance with the methods described above, if the N-UP print has been once designated, the logical pages are reduced and layout printed on one physical page unless the setting is changed, even when it is intended to print one page portion of the document data whose logical pages do not produce any particular effect by the operation of layout print, because the previous N-UP setting is still kept effective. More specifically, for example, if the 2 UP print has been once designated, the layout print is performed either one of the two directions each segmented into the left and right or the top and bottom on the physical page depending on the designation of the layout directions. Therefore, the surface on the other direction becomes the marginal portion accordingly.

Likewise, if the 4-UP print has been once designated, the layout print is made in either one of the four segments on one physical page, and the surface of the other segments becomes the marginal portion accordingly. Therefore, not only the marginal portion is wasted, but also, the print style may be spoiled.

Also, in order to avoid this marginal print drawback, the operator should designate the print mode again for the desired layout when he instructs the next print. The number of operations should increase eventually.

Also, when it is intended to N-UP print the document data which has a plurality of logical pages in anticipation of a higher layout print effect, there is a need for the operator to designate the 2-UP which may layout print the document data of 2 logical pages effectively into the data of one physical page savingly without any wasteful marginal portion which should be saved or to designate the 4-UP that may effectively print the document data of 3 or 4 logical pages into the data of one physical page savingly without any wasteful marginal portion, for example. In such a manner, the operator should designate the appropriate N-UP in accordance with the number of pages of the document data or the like. Consequently, the number of operations should increase inevitably.

Further, when using the text editor or the like which is not provided with any function to adjust the style of a printed page by the adoption of any application, for example, it is difficult for the operator to designate an appropriate N-UP for saving the output pages, because the segmentation per unit of page is made by means of a simple counting of line numbers or the like in the interior of the application currently available, which is not good enough to let the operator know in advance the anticipated page style, the total number of pages, and so on.

SUMMARY OF THE INVENTION

The present invention is designed to solve the problems discussed above. It is an object of the invention to provide a data processing apparatus which is arranged to generate and output the intermediate data having the layout page number set in advance or having the page number different from such layout page number, which is edited per page, with the designation of the print mode accompanied by the reduced layout to be set, and the logical page numbers to be printed, and then, to generate the output intermediate data with the layout of the optimum page number, which depends on the page numbers of the print data designated for printing, and the data processing apparatus is made capable of automatically avoiding the print process having the improper style with the excessive margin due to a smaller number of logical pages in the print data, and at the same time, saving the output sheets significantly without any particular preventive operation even when the layout print is designated at the time of executing the print process as arranged above. It is also an object of the invention to provide a method for processing print data for the data processing apparatus, and a storage medium that stores a program readable by a computer, as well as a data process program product.

According to a first aspect of the present invention, a data processing apparatus, which is capable of generating the intermediate data in the form different from the print data before generating the print data to be transmitted to a print apparatus through a specific communication medium, provisionally keeping the intermediate data, and generating the print data from the intermediate data, comprises means for recording page information to record the logical page information for the print data to be transmitted to the print apparatus when the intermediate data is generated; means for editing intermediate data to edit the intermediate data having a predetermined page layout number or the page number different from the layout page number in accordance with the print mode designated by means for designating print mode and the logical page information recorded in the means for recording page information; and output means to generate the print data analyzable by the print apparatus in accordance with the output intermediate data edited per page by the means for editing intermediate data, and to output the data to the print apparatus.

According to a second aspect of the present invention, the means for designating print mode designates the page layout print mode and the page number to be laid out in one page.

According to a third aspect of the present invention, the means for designating print mode designates the print mode of whether or not the page number to be laid out in one page is automatically calculated when the page layout print mode is designated.

According to a fourth aspect of the present invention, the print apparatus comprises the double-side print function, and the means for designating print mode is able to designate the double-side print for the print apparatus.

According to a fifth aspect of the present invention, the means for recording page information counts the total page number of the print data, and records the logical page information of the print data to be transmitted to the print apparatus.

According to a sixth aspect of the present invention, the means for editing intermediate data performs the page edit accompanied by the reduced page layout when the page layout print mode is designated by the means for designating print data.

According to a seventh aspect of the present invention, the means for editing intermediate data performs the page edit to layout the intermediate data having a portion of page numbers different from the designated page number when the mode is designated to automatically calculate the page number to be laid out in one page.

According to an eighth aspect of the present invention, the means for editing intermediate data performs the page edit to layout the intermediate data having a portion of page numbers different from the designated page number when the mode is designated to automatically calculate the page number to be laid out in one page and the double-side print is designated.

According to a ninth aspect of the present invention, the means for editing intermediate data performs the automatic calculation of page number to be laid out in one page in accordance with the total page number of the print data, while defining the designated page number as maximum, for the effective arrangement of each page of the print data on an output sheet when the mode is designated to automatically calculate the page number to be laid out in one page.

According to a tenth aspect of the present invention, the means for editing intermediate data performs the automatic calculation of page number to be laid out in one page in accordance with the total page number of the print data, while defining the designated page number as maximum, for the effective arrangement of each page of the print data on the double-side of an output sheet when the mode is designated to automatically calculate the page number to be laid out in one page and the double-side print is designated.

According to an eleventh aspect of the present invention, the means for editing intermediate data performs the automatic calculation of page number to be laid out in one page in accordance with the total page number of the print data, not depending on the designated page number, for the proper arrangement of each page of the print data within one page of an output sheet when the mode is designated to automatically calculate the page number to be laid out in one page.

According to a twelfth aspect of the present invention, the means for editing intermediate data performs the automatic calculation of page number to be laid out in one page in accordance with the total page number of the print data, not depending on the designated page number, for the proper arrangement of each page of the print data on the double-side of an output sheet when the mode is designated to automatically calculate the page number to be laid out in one page and the double-side print is designated.

According to a thirteenth aspect of the present invention, the print mode designation is made by a specific input unit.

According to a fourteenth aspect of the present invention, the input unit is a pointing device or a keyboard.

According to a fifteenth aspect of the present invention, the means for editing intermediate data begins editing pages when the execution of the print process is instructed in accordance with the print mode designated by the means for designating print mode.

According to a sixteenth aspect of the present invention, a method for processing print data for the data processing apparatus, which is capable of generating the intermediate data in the form different from the print data before generating the print data to be transmitted to a print apparatus through a specific communication medium, provisionally keeping the intermediate data in a memory source, and generating the print data from the intermediate data per unit of page, comprises the following steps of: recording page information to record the logical page information for the print data to be transmitted to the print apparatus in the memory source when the intermediate data is generated and kept provisionally; editing intermediate data to edit the intermediate data having a predetermined page layout number or the page number different from the layout page number in accordance with the print mode designated in the step of designating print mode and the logical page information recorded in the step of recording page information; and generating the print data analyzable by the print apparatus in accordance with the output intermediate data edited per page in the step of editing intermediate data, and outputting the data to the print apparatus.

According to a seventeenth aspect of the present invention, the step of designating print mode is for the designation of the page layout print mode and the page number to be laid out in one page.

According to an eighteenth aspect of the present invention, the step of designating print mode is for the designation of the print mode of whether or not the page number to be laid out in one page is automatically calculated when the page layout print mode is designated.

According to a nineteenth aspect of the present invention, the print apparatus comprises the double-side print function, and the step of designating print mode is for the designation of the double-side print for the print apparatus.

According to a twentieth aspect of the present invention, the step of recording page information is for counting the total page number of the print data, and recording the logical page information of the print data to be transmitted to the print apparatus.

According to a twenty-first aspect of the present invention, the step of editing intermediate data is for the performance of the page editing accompanied by the reduced page layout when the page layout print mode is designated in the step of designating print data.

According to a twenty-second aspect of the present invention, the step of editing intermediate data is for the performance of the page edit to layout the intermediate data having a portion of page numbers different from the designated page number when the mode is designated to automatically calculate the page number to be laid out in one page.

According to a twenty-third aspect of the present invention, the step of editing intermediate data is for the performance of the page edit to layout the intermediate data having a portion of page numbers different from the designated page number when the mode is designated to automatically calculate the page number to be laid out in one page and the double-side print is designated.

According to a twenty-fourth aspect of the present invention, the step of editing intermediate data is for the performance of the automatic calculation of page number to be laid out in one page in accordance with the total page number of the print data, while defining the designated page number as maximum, for the effective arrangement of each page of the print data on an output sheet when the mode is designated to automatically calculate the page number to be laid out in one page.

According to a twenty-fifth aspect of the present invention, the step of editing intermediate data is for the performance of the automatic calculation of page number to be laid out in one page in accordance with the total page number of the print data, while defining the designated page number as maximum, for the effective arrangement of each page of the print data on the double-side of an output sheet when the mode is designated to automatically calculate the page number to be laid out in one page and the double-side print is designated.

According to a twenty-sixth aspect of the present invention, the step of editing intermediate data is for the performance of the automatic calculation of page number to be laid out in one page in accordance with the total page number of the print data, not depending on the designated page number, for the proper arrangement of each page of the print data within one page of an output sheet when the mode is designated to automatically calculate the page number to be laid out in one page.

According to a twenty-seventh aspect of the present invention, the step of editing intermediate data is for the performance of the automatic calculation of page number to be laid out in one page in accordance with the total page number of the print data, not depending on the designated page number, for the proper arrangement of each page of the print data on the double-side of an output sheet when the mode is designated to automatically calculate the page number to be laid out in one page and the double-side print is designated.

According to a twenty-eighth aspect of the present invention, the print mode designation is made by a specific input unit.

According to a twenty-ninth aspect of the present invention, the input unit is a pointing device or a keyboard.

According to a thirtieth aspect of the present invention, the means for editing intermediate data begins editing pages when the execution of the print process is instructed in accordance with the print mode designated by the step of designating print mode.

According to a thirty-first aspect of the present invention, a storage medium, which stores a program readable by a computer controlling the data processing apparatus capable of generating the intermediate data in the form different from the print data before generating the print data to be transmitted to a print apparatus through a specific communication medium, provisionally keeping the intermediate data in a memory source, and generating the print data from the intermediate data per unit of page, comprises the following steps of: recording page information to record the logical page information for the print data to be transmitted to the print apparatus in the memory source when the intermediate data is generated and kept provisionally; editing intermediate data to edit the intermediate data having a predetermined page layout number or the page number different from the layout page number in accordance with the print mode designated in the step of designating print mode and the logical page information recorded in the step of recording page information; and generating the print data analyzable by the print apparatus in accordance with the output intermediate data edited per page in the step of editing intermediate data, and outputting the data to the print apparatus.

According to a thirty-second aspect of the present invention, the step of designating print mode is stored in the storage medium as a program readable by a computer for the designation of the page layout print mode and the page number to be laid out in one page.

According to a thirty-third aspect of the present invention, the step of designating print mode is stored in the storage medium as a program readable by a computer for the designation of the print mode of whether or not the page number to be laid out in one page is automatically calculated when the page layout print mode is designated.

According to a thirty-fourth aspect of the present invention, the print apparatus comprises the double-side print function, and the step of designating print mode is stored in the storage medium as a program readable by a computer for the designation of the double-side print for the print apparatus.

According to a thirty-fifth aspect of the present invention, the step of recording page information is stored in the storage medium as a program readable by a computer for counting the total page number of the print data, and recording the logical page information of the print data to be transmitted to the print apparatus.

According to a thirty-sixth aspect of the present invention, the step of editing intermediate data is stored in the storage medium as a program readable by a computer for the performance of the page editing accompanied by the reduced page layout when the page layout print mode is designated in the step of designating print data.

According to a thirty-seventh aspect of the present invention, the step of editing intermediate data is stored in the storage medium as a program readable by a computer for the performance of the page edit to layout the intermediate data having a portion of page numbers different from the designated page number when the mode is designated to automatically calculate the page number to be laid out in one page.

According to a thirty-eighth aspect of the present invention, the step of editing intermediate data is stored in the storage medium as a program readable by a computer for the performance of the page edit to layout the intermediate data having a portion of page numbers different from the designated page number when the mode is designated to automatically calculate the page number to be laid out in one page and the double-side print is designated.

According to a thirty-ninth aspect of the present invention, the step of editing intermediate data is stored in the storage medium as a program readable by a computer for the performance of the automatic calculation of page number to be laid out in one page in accordance with the total page number of the print data, while defining the designated page number as maximum, for the effective arrangement of each page of the print data on an output sheet when the mode is designated to automatically calculate the page number to be laid out in one page.

According to a fortieth aspect of the present invention, the step of editing intermediate data is stored in the storage medium as a program readable by a computer for the performance of the automatic calculation of page number to be laid out in one page in accordance with the total page number of the print data, while defining the designated page number as maximum, for the effective arrangement of each page of the print data on the double-side of an output sheet when the mode is designated to automatically calculate the page number to be laid out in one page and the double-side print is designated.

According to a forty-first aspect of the present invention, the step of editing intermediate data is stored in the storage medium as a program readable by a computer for the performance of the automatic calculation of page number to be laid out in one page in accordance with the total page number of the print data, not depending on the designated page number, for the proper arrangement of each page of the print data within one page of an output sheet when the mode is designated to automatically calculate the page number to be laid out in one page.

According to a forty-second aspect of the present invention, the step of editing intermediate data is stored in the storage medium as a program readable by a computer for the performance of the automatic calculation of page number to be laid out in one page in accordance with the total page number of the print data, not depending on the designated page number, for the proper arrangement of each page of the print data on the double-side of an output sheet when the mode is designated to automatically calculate the page number to be laid out in one page and the double-side print is designated.

According to a forty-third aspect of the present invention, the print mode designation is stored in the storage medium as a program readable by a computer and made executable by a specific input unit.

According to a forty-fourth aspect of the present invention, the input unit is arranged to be a pointing device or a keyboard and made operative in accordance with a stored program readable by a computer.

According to a forty-fifth aspect of the present invention, the step of editing intermediate data is stored in the storage medium as a program readable by a computer, and begins editing pages when the execution of the print process is instructed in accordance with the print mode designated by the step of designating print mode.

According to a forty-sixth aspect of the present invention, a program product for the execution of the above-described processes is provided.

BRIEF DESCRIPTION OF THE DRAWINGS

FIG. 6 is a view which shows one example of the draw command source to be transferred from the application program on the RAM represented in FIG. 1 to the print process program.

FIG. 12 is a view which shows one example of a first table for determining the number of pages to be stored on the information processing apparatus represented in FIG. 1.

FIG. 14 is a view which shows a second table for determining the number of pages to be stored on the information processing apparatus represented in FIG. 1.

FIG. 15 is a view which shows a third table for determining the number of pages to be stored on the information processing apparatus represented in FIG. 1.

FIG. 16 is a view which shows a fourth table for determining the number of pages to be stored on the information processing apparatus represented in FIG. 1.

FIG. 17 is a view which illustrates the memory map of the storage medium that stores various kinds of data process programs which are readable by the print system to which the data processing apparatus of the present invention is applicable.

DETAILED DESCRIPTION OF THE PREFERRED EMBODIMENTS

Hereinafter, with reference to the accompanying drawings, the detailed description will be made of the preferred embodiments in accordance with the present invention.

First Embodiment

Figure 1:
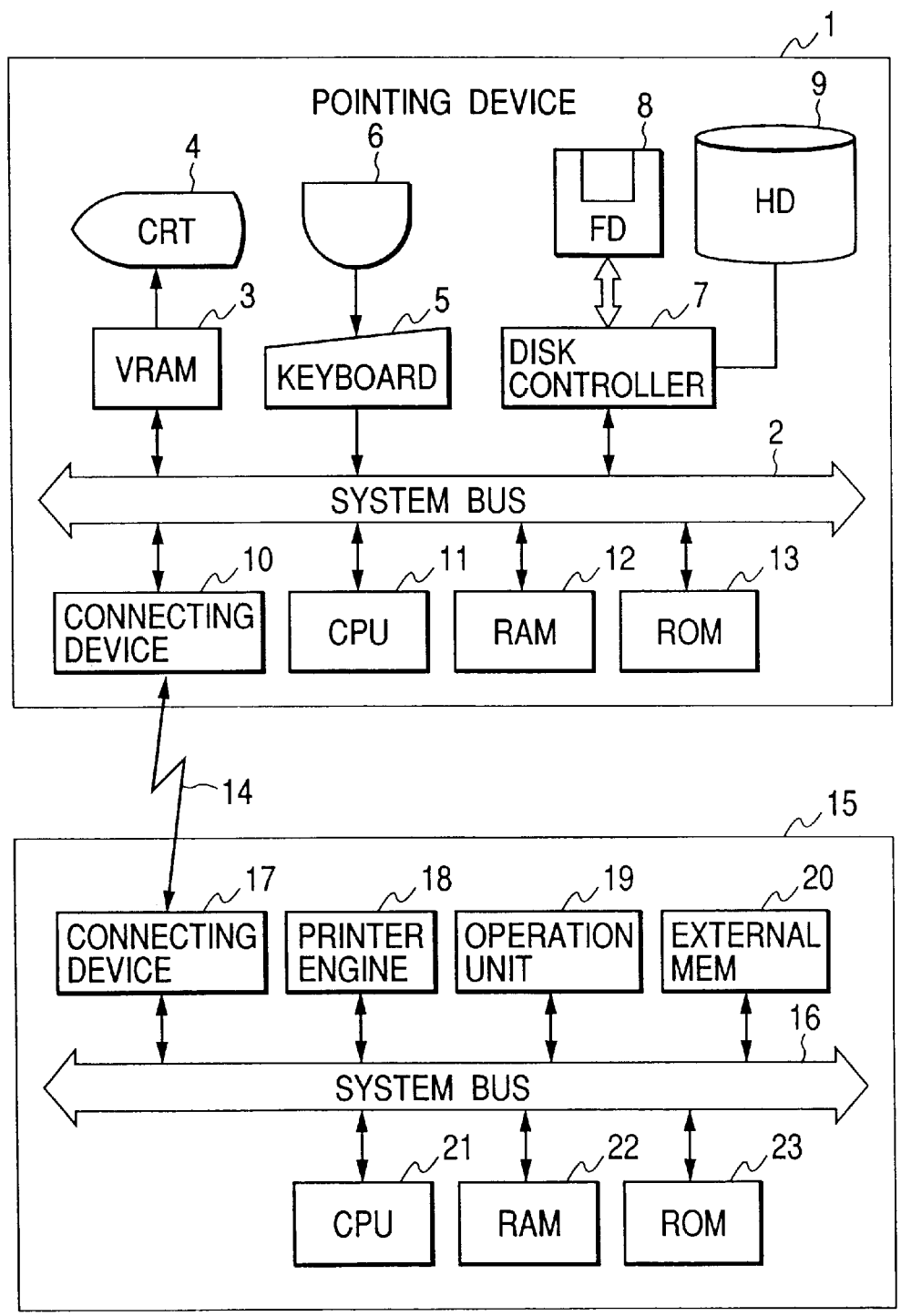
FIG. 1 is a block diagram which illustrates the structure of the print system to which the data processing apparatus of a first embodiment of the present invention is applicable.

FIG. 1 is a block diagram which illustrates the structure of the print system to which the data processing apparatus of a first embodiment of the present invention is applicable. This diagram corresponds to the case where the communication is possible through a specific communication medium between the information processing apparatus, such a personal computer, which serves as the data source, and a printer.

In FIG. 1, a reference numeral 1 designates an information processing apparatus, such as a personal computer, which comprises as its principal constituents the video memory (hereinafter referred to as a VRAM) 3, the indication unit (hereinafter referred to as a CRT) 4, the keyboard 5, the pointing device (hereinafter referred to as a PD) 6, the disc controller unit 7, the hard disc device (hereinafter referred to as an HD) 9, the connecting unit 10, the CPU 11, the RAM 12, and the ROM 13, which will be described later in detail. These constituents are connected with each other through the system bus 2.

The CPU 11 controls the information processing apparatus as a whole in accordance with the program which will be shown in the flowcharts represented in FIG. 4 and others to be described later. Also, the RAM 12 serves as the main memory to store the program, and at the same time, it is provided with a storage area used as a work area to provisionally store various data when the control is executed by the CPU 11.

The disc controller unit 7 controls the access to the external storage devices, such as HD 9 or a floppy disc (hereinafter referred to as a FD) 8 serving as the external memory.

The HD 9 and FD 8 are the devices that record data on the magnetic storage medium on each disc and perform reading and writing operations. These devices store the various graphics data, the document data, and further, the boot program of the information processing apparatus 1, which is down loaded on the RAM 12 for execution, the operating system (OS) serving as the control program of the CPU, the various application programs, the printer control command (print data) generation program (printer driver), and the print system program which is provided with the print data synthesizing function or the like, among some others.

Also, besides the HD 9 and FD 8, the magnetic tape, the CD-ROM, the IC memory card, DVD, and the like may be adopted for the storage medium.

The ROM 13 is the inner memory to store various data and programs as in the case of the HD 9, FD 8 and the like.

Also, the CRT 4 is arranged for the information processing apparatus 1 with a CRT (cathode ray tube), liquid crystal, or FLC, among some others, to display on its screen the user interface (UI), such as the bid map data and various other graphics, and the command image such as the command menu, and also, messages or the like provided for the operator.

The VRAM 3 stores the data which should be displayed on the CRT 4.

The keyboard 5 and the PD 6 are both handled by the operator to input various data and commands or print mode and the like. Also, when each of the command images indicated on the screen of the CRT is selected by use of the keyboard 5 and PD 6, it becomes possible to execute the command thus selected or designate the print mode as required.

Here, a reference numeral 10 designates the connecting unit which is connected with the connecting unit 16 of the print apparatus (printer) 16 through the centronics interface, the network interface, or some other specific bidirectional interface 14 in order to execute the communication control process, such as the transmission of the printer control command (print data) to the printer 15, which will be described later.

A reference numeral 15 designates the printer apparatus which comprises as its principal constituents the connecting unit 17, the print unit (printer engine) 18, the operation unit 19, the external memory 20, the CPU 21, the RAM 22, and the ROM 23, which will be described later in detail. These constituents are connected with each other through the system bus 16.

The CPU 21 is a printer CPU, which controls the printer apparatus 15 as a whole. The CPU 21 transmits the image signals to the printer engine 18 in accordance with the printer control command (print data) received by the connecting unit 17 under the control program stored on the ROM 13 or the external memory 20 which will be described later.

The RAM 22 functions as the main memory of the CPU 21, and it is provided with the storage area as the work data area where various data are stored provisionally when the control is executed by the CPU 21. The external memory 20 may be connected as an optional device, and stores the font data, the emulation program, the form data, and some others.

The ROM 23 is the printer inner memory, and like the external memory, it stores various data, and the printer control program that controls the printer apparatus, among some others.

Also, the printer unit 18 is the printer engine which is controlled by the CPU 21 to execute the actual printing when receiving the image signals which are output by the control program stored on the ROM 23 or the external memory 20 through the system bus.

The operation unit 19 comprises the operation panel and the input unit, such as operational switches, and the indication unit formed by LED, the liquid crystal panel or the like, which accepts the operation from the operator or displays the result thereof. The operator designates the setting of the printer engine 15 or confirm it through the operation unit 19.

A reference numeral 17 designates the connecting unit which is connected with the connecting unit 16 of the information processing apparatus 1 through the aforesaid bidirectional interface 14 to receive the printer control command (print data) or to notify the inner status of the printer or the like.

Now, with reference to FIG. 2 and FIG. 3, the description will be made of the pre-process up to the operation of the print process apparatus hereof which is provided with the print data synthesizing function or the like for the information processing apparatus 1 of the present embodiment.

This print process apparatus operates when the CPU executes the basic I/O program, the operating system (OS), and the print process program. The basic I/O program is written on the ROM 13. The operating system (OS) is written on the HD 9 or FD 8 or some other external storage memory.

At first, when the power-supply of the information processing apparatus 1 is turned on, the operating system (OS) stored on the HD 9 or the FD 8 or some other external storage memory is read out to the RAM 12 by the function of the initial program loading (IPL) of the basic I/O program, thus operating the OS.

Then, the operator selects the command image or the like displayed on the screen of the CRT 3 by use of the keyboard 5 and the PD 6, and instructs the execution of the application. Thus, the application stored on the HD 9, the FD 8, or some other external storage memory is read out to the RAM 12, hence operating the application.

Then, in the same procedure as the actuation of the application, the operator instructs printing. The print process program, which is provided with the print data synthesizing function or the like, and the printer command generation program (printer driver) stored on the HD 9, the FD 8, or some other external storage memory are read out to the RAM 12, hence operating the print process system.

In accordance with the present embodiment, the print process program and the associated data are stored on the FD 8. The setup of the recorded contents is shown in FIG. 2.

Figure 2:
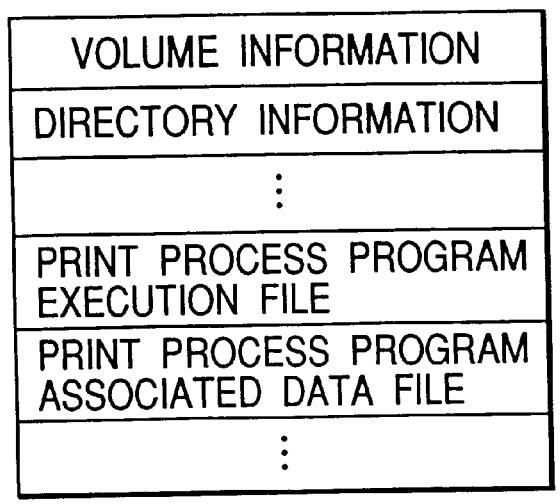
FIG. 2 is a view which shows one example of the memory map of the floppy disc (FD) represented in FIG. 1.

FIG. 2 is a view which shows one example of the memory map of the FD 8 represented in FIG. 1. Here, the print process program stored on the FD 8 and the associated data may be loaded to the information processing apparatus 1 through the disc controller unit 7.

When this floppy disc 8 is set to the disc controller unit 7, the print process program and the associated data are read out from the FD 8 under the control of the OS and the basic I/O program, and loaded to the RAM 12 to make the operation possible.

Figure 3:
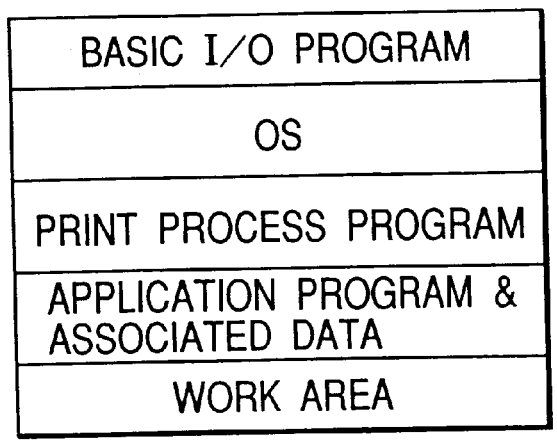
FIG. 3 is a view which shows one example of the memory map of the RAM represented in FIG. 1.

FIG. 3 is a view which shows one example of the memory map of the RAM 12 represented in FIG. 1, which corresponds to the state where the print process program shown in FIG. 2 is loaded to the RAM 12 to make it executable.

Now, with reference to the flowcharts, the user interface (UI) shown on the screen, the tables and output examples contained in FIG. 4 to FIG. 13, the description will be made of the method for operating the print process system which is provided with the print data automatic page layout function or the like for the information processing apparatus in accordance with the present embodiment.

In this respect, this process is initiated by the aforesaid operational steps in the state where the program of the printable application or the like is in operation.

For the present embodiment, the print process of the document data is designated by the application, and also, the N-UP print is designated together with the style of the print and the number of pages N to be laid out on one page of the output sheet. Further, the automatic N-UP print mode is designated. With these designations, then, the intermediate data write program converts the document data received from the application into the intermediate data. The intermediate data thus converted is provisionally kept as the file of the intermediate data. Thus, the total page number I of the logical pages is calculated to generate a page information file in which the page information is recorded including the total page number. After that, the page information file is read out by the intermediate data edit program to calculate anew the optimum N-UP page number N.

Here, when the print mode is N-UP, and also, the automatic N-UP mode is designated, the optimum N-UP page number is assumed to be N=1 if the total page number I is 1 page or N=2 if the total page number I is 2 pages or more.

Also, when the 4-UP is designated, the N=1 if the total page number I is 1 page; the N=2 if the total page number I is 2 pages; or the N=4 if the total page number I is 3 pages or more.

Further, when the 8-UP is designated, the N=1 if the total page number I is 2 pages; or the N=4 if the total page number I is 3 pages or 4 pages; and the N=8 if the total page number I is 5 pages or more.

Likewise, with the designated N as the maximum value, the optimum N is assumed to be the value that enables the total page number I to be laid out effectively as the physical pages. Then, the intermediate data edit program reads out each of the files that have provisionally kept the intermediate data, and processes the page layout in accordance with the N-UP page number N, hence processing the page layout print.

Subsequently, the intermediate data output program outputs the intermediate data to the printer control command generation program (printer driver) or outputs it to a program that resides in the pre-step thereof, and the printer control command generation program (printer driver) generates the printer control command (print data) lastly for the print performance.

Figure 4:
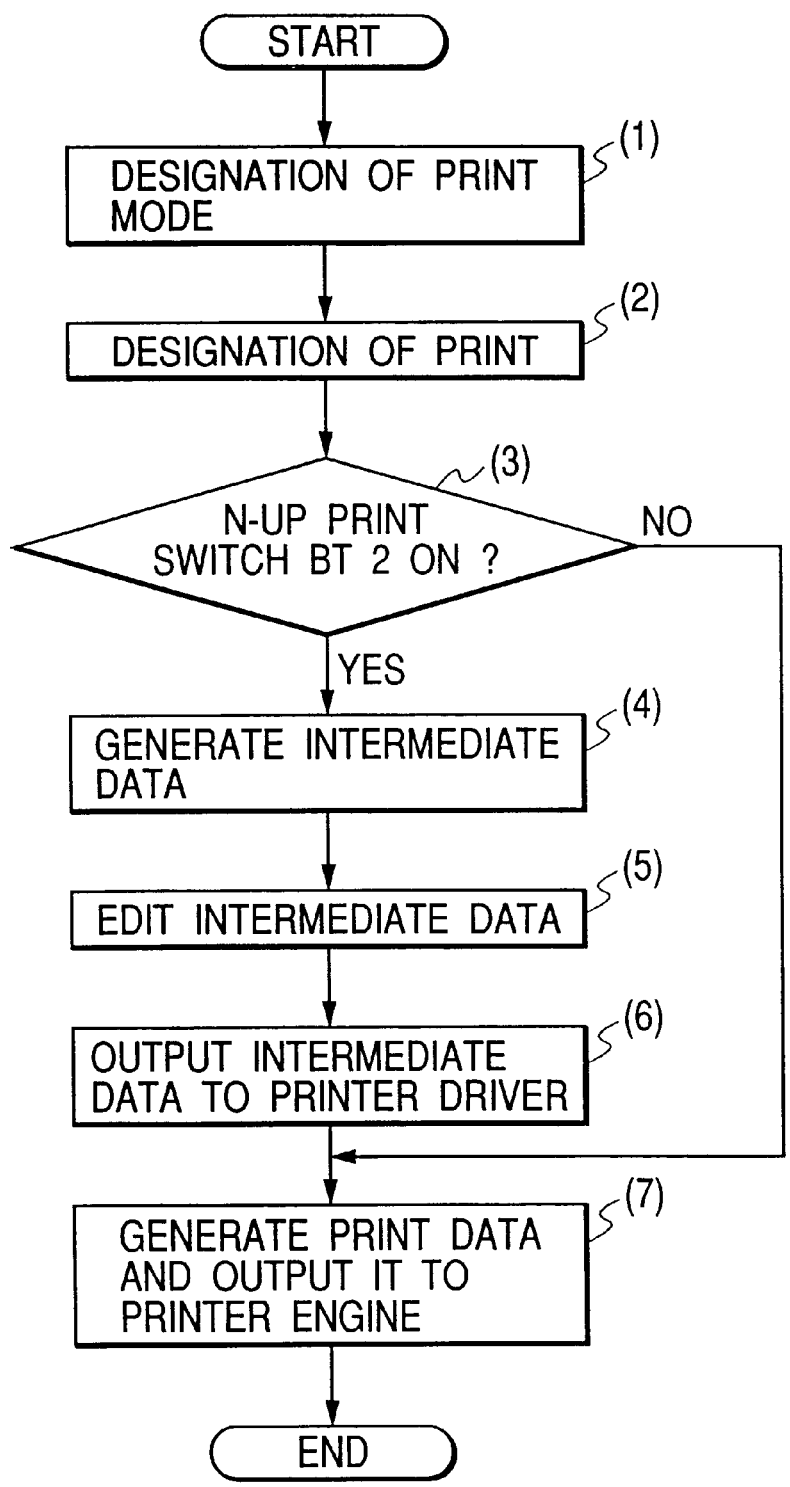
FIG. 4 is a flowchart which shows one example of a first data process procedure for the data processing apparatus in accordance with the present invention.

FIG. 4 is a flowchart which shows one example of a first data process procedure for the data processing apparatus in accordance with the present invention, which corresponds to the data process on the information processing apparatus represented in FIG. 1. In this respect, the numerals (1) to (7) designate each of the steps.

At first, in step (1), the print style, the page numbers, the layout order, and the automatic N-UP print mode are designated as the print mode that enables the print process system to operate accordingly.

Then, in step (2), the print is designated. Here, it may be possible to designate the print mode and print by the operation of the keyboard 5 and the PD 6 shown in FIG. 1, and then, by the selection of the command image or the like among the command menu indicated on the print mode screen (see FIG. 5) displayed in the CRT 3.

Figure 5:
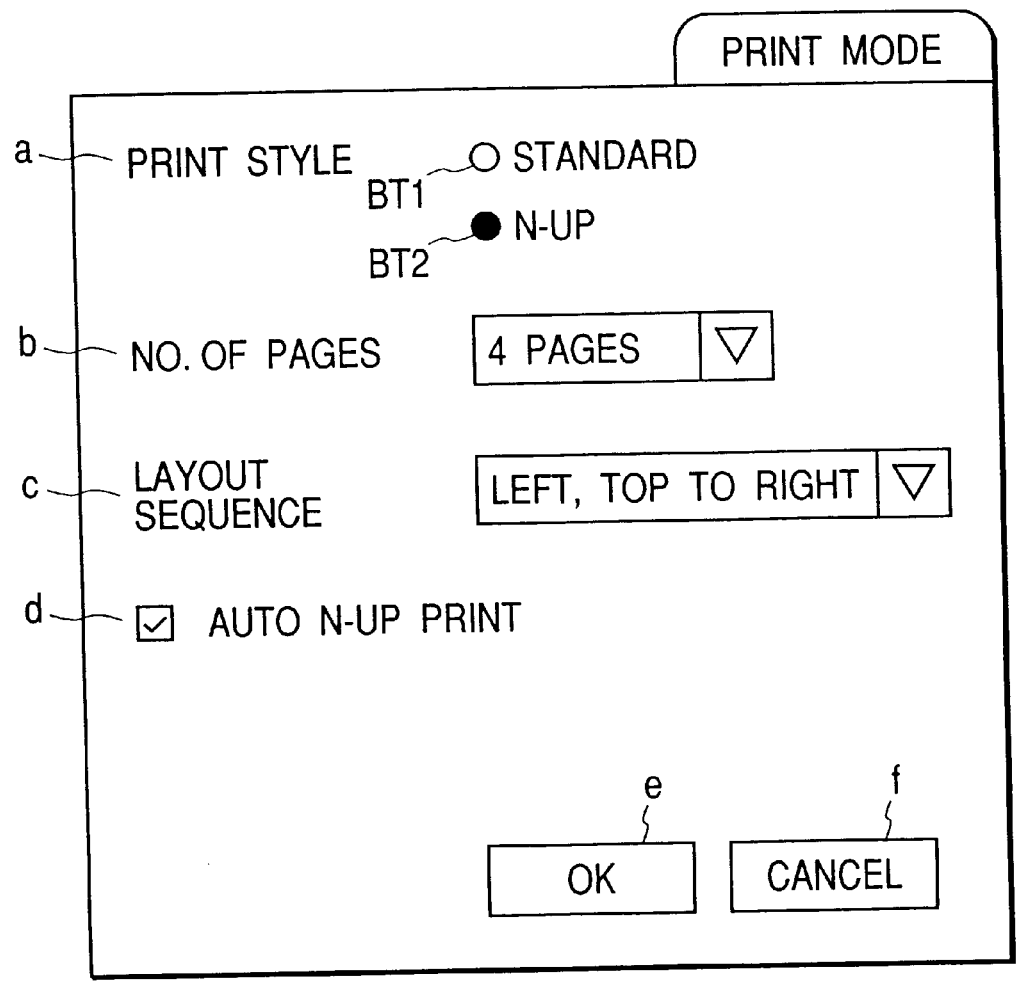
FIG. 5 is a view which shows one example of the print mode designation screen to be displayed on the indication unit represented in FIG. 1.

Then, in step (3), it is determined whether or not the N-UP print switch (the button BT2 of the switch a shown in FIG. 5), which is designated in the step (1), is turned on (FIG. 5 shows the state where the switch is on). If the N-UP print switch is found to be turned off, it is interpreted that the process is for the usual printing, and the page layout process of the print process system hereof is skipped, thus the process proceeding to step (7) where the print control command (print data) is generated and output to the printer 15. Then, the process terminates.

This process has been the usual print steps in which the printer control command generation program (printer driver) operates.

On the other hand, in the step (3), if the N-UP print switch is found to be turned on, the process proceeds to step (4) where the intermediate data is generated. Then, with the generation of the intermediate data, the process proceeds to step (5) where the intermediate data is edited.

Then, the process proceeds to step (6) where the intermediate data is output to the printer driver, thus proceeding to step (7) where the printer control command (print data) is generated. The data thus generated is output to the printer. Then, the print process of the present embodiment terminates.

Now, in conjunction with FIG. 5, the detailed description will be made of the method for designating the print mode in the step (1) shown in FIG. 4.

FIG. 5 is a view which shows one example of the print mode designation screen displayed on the CRT 3 represented in FIG. 1. This screen corresponds to the user interface (UI) for use of the print mode in which the user designates the print mode in the step (1) of the present embodiment shown in FIG. 4.

In FIG. 5, the reference mark a designates the N-UP print designation switch the state of which is determines the print style in the step (3) shown in FIG. 4. In this respect, there are provided the button BT-1 which is used for the designation of the usual print, and the button BT2 which is used for the designation of the N-UP print. The use of the buttons BT1 and BT2 is against each other, and only one mode of the two is made selective. FIG. 5 shows the state where the N-UP print is currently selected. The N-UP print button BT2 is turned to be in "black" in FIG. 5.

A reference mark b designates the combo box whereby to designate the number of pages at the time of the N-UP print. The structure is arranged to make the page numbers "2", "4", "8", "9", "16" or the like selective, which can be designated sequentially by clicking the down arrow mark button on the right side of the combo box with the operation of the PD 6 at the time of N-UP print. Here, in accordance with the example shown in FIG. 5, the state is shown in which the "4" pages is selected as the current number of pages.

A reference mark c designates the combo box whereby to designate the layout order at the time of the N-UP print. The structure is arranged to set the layout order that can be designated corresponding to the aforesaid page numbers at the time of the N-UP print, and make the layout selective as "left upper, starting in the right direction", "right upper, starting in the left direction", "left upper, starting in the downward direction", "right upper, starting in the downward direction" or the like by clicking the down arrow mark button on the right side of the combo box with the operation of the PD 6. Here, in accordance with the example shown in FIG. 5, the "left upper, starting in the right direction" is selected for the current layout order.

Also, a reference mark d designates the check box whereby to designate whether or not the automatic N-UP print, which is the present embodiment, is performed at the time of the N-UP print. In accordance with the example shown in FIG. 5, the automatic N-UP print mode is selected with the designation of the N-UP print by use of the button a, and then, the current state shows that the automatic check box d is checked on.

A reference mark e designate an OK button switch, which is selected by the operation of the PD device 6 to determine the selected mode; f, a cancel button to cancel the designated mode and the designation of the print mode by the operation of the pointing device 6.

In this respect, if the OK button is selected and the mode is determined, the information of the print mode and others is provisionally stored in the work area of the RAM 12, hence making the reference possible to such information in the later steps.

Also, if the double-side print function is supported by the printer main body, and such support is indicated on the mode setting screen shown in FIG. 5, it becomes possible to designate the double-side print.

Now, with reference to FIG. 6 and FIGS. 7A and 7B, the description will be made of the method for generating the intermediate data shown in the step (4) in FIG. 4.

FIG. 6 is a view which shows one example of the draw command source transferred from the application program on the RAM 12 represented in FIG. 1 to the print process program, which corresponds to the draw command group of the document data transferred from the application or the like to the print process system when the print execution is designated as in the step (2) shown in FIG. 4 in accordance with the present embodiment.

As shown in FIG. 6, the draw commands of the present embodiment begin with the "job start command" and terminate with the "job end command".

Also, the printer initiation command appears next to the "job start command", which contains the "paper size designation command", the "print direction designation command", and some others. The draw commands contain the "character print command", the "color designation command", the "figure draw command", the "image draw command", the "new page command", and some others.

The "color designation command" is a command that designates colors in advance when the "character print command" or the "figure draw command" is given, and this command designates the colors of the characters and figures to be printed in the form of RGB.

Also, the "image draw command" contains the color data table in the form of RGB in the data section in the general image data form. When an image is drawn, the color of each pixel is designated by the value of each pixel which presents the corresponding index of this color table.

Besides these items, the "image draw command" contains the bit map data, and the drawing information of the width, height, and coordinate positions of an image, among some others. Further, the "character print command" contains the information of the kinds of characters, the character codes, the character print coordinates, the character width, the character height, the height of line feed, and some others. Also, the "figure draw command" contains the kinds of figures to be drawn, the attribute of each of the figures drawn, the coordinates of the drawing position, and the like.

Figure 7B:
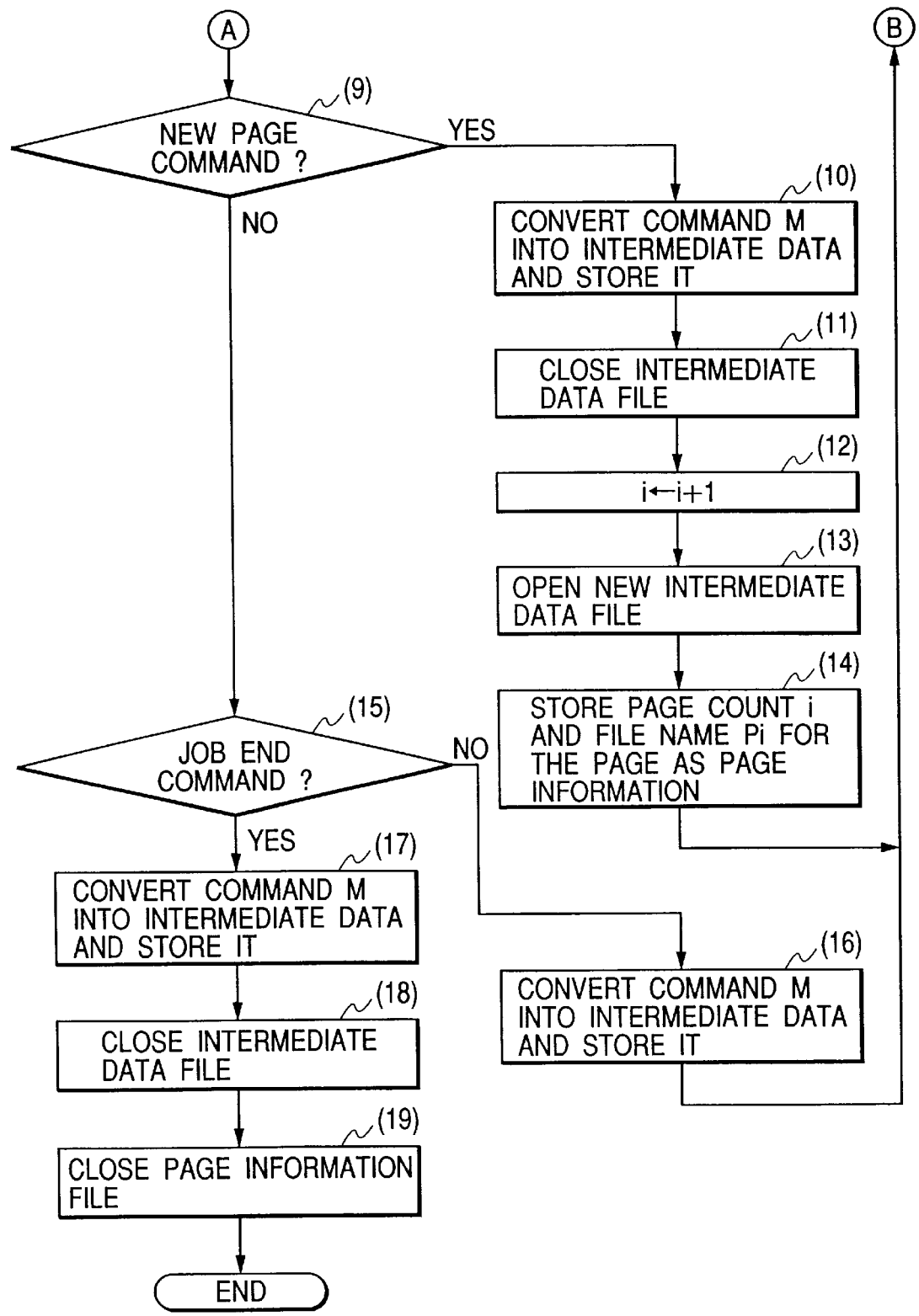
FIG. 7 is comprised of FIGS. 7A and 7B illustrating flowcharts which shows one example of a second data process procedure for the data process apparatus in accordance with the present invention.

FIGS. 7A and 7B flowcharts which shows one example of a second data process procedure for the data processing apparatus in accordance with the present invention, which corresponds to the intermediate data generation step (4) represented in FIG. 4 in accordance with the present embodiment, that is, the detailed procedural step in which the intermediate data is generated with the draw commands shown in FIG. 6. In this respect, the reference numeral (1) to (19) designate each of the steps, respectively.

At first, in step (1), the page counter i is initialized to "0". Then, proceeding to step (2), the process receives each one command of the draw commands shown in FIG. 6 sequentially from the beginning, and gives it as M.

Then, in step (3), it is determined whether or not the draw command M which the process has received in the step (2) is the "job start command". If affirmative, the process proceed to step (4) to open the page information file for recording the page information.

Then, in step (5), the intermediate data file is open in order to provisionally keep the intermediate data of the first page. Thus, in step (6), the page counter i is set at "i+1".

Then, in step (7), the page number (page counter i) and the file name Pi of the file to provisionally keep the intermediate data corresponding to such page, which has been open in the step (5), are stored as the page information.

Then, in step (8), the draw command M thus received is converted into the intermediate data, and stored in the file to keep the intermediate data provisionally, which has been open previously. Thus the process returns to the step (2) where the next draw command is received and given afresh as a draw command M.

On the other hand, if it is found in the step (3) that the draw command M received is not the "job start command", the process proceeds to step (9), where it is determined whether or not the draw command M is the "ne page command". If affirmative, the process proceeds to step (10) where the draw command M is converted into the intermediate data and stored as in the step (8).

Then, proceeding to step (11), the process closes the first file to provisionally keep the intermediate data that has been in use. Then, in step (12), the page counter i is set at "i+1". In step (13), then, the intermediate data file is open afresh in order to keep the first intermediate data provisionally.

Now, proceeding to step (14), the process returns to the step (2) after having stored the page number (page counter i) and the file name Pi of the file to keep the intermediate data provisionally, which has been open in the step (13) as the page information. Then, the process receives the next draw command and gives it as the draw command M afresh.

On the other hand, if it is found in the step (9) that the draw command M is not the "new page", the process proceed to step (15) where it is determined whether or not the draw command M is the "job end command". If negative, the process proceed to step (16) where the draw command is converted into the intermediate data, and then, stored. Thus, the process returns to the step (2) and receives the next draw command and gives it as the draw command M afresh.

If, on the other hand, the draw command M is found to be the "job end command" in the step (15), the process proceed to step (17) where the draw command M is converted into the intermediate data, and stored.

Then, proceeding to-step (18), the process closes the file to provisionally keep the intermediate data stored as the intermediate data that has been used as reference. Thus, the process terminates.

Now, with reference to FIG. 8, the description will be made of the method for storing the page information shown in the step (7) and the step (14), and the method for converting into the intermediate data and storing it shown in the step (8), the step (16) and the step (17) in FIG. 7B.

Figure 8:
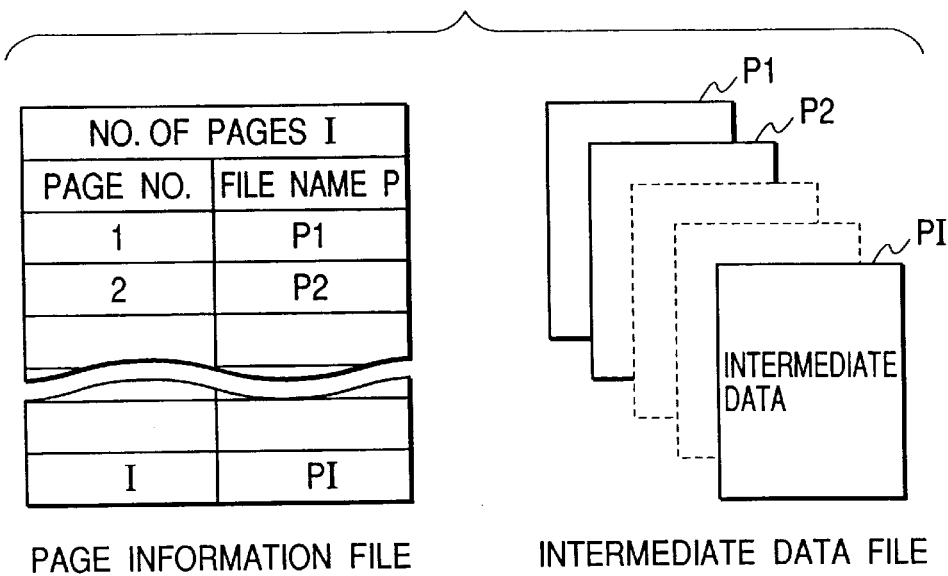
FIG. 8 is a view which illustrates the relationship between the intermediate data file and the file for provisionally keeping the intermediate data, which are secured on the hard disc represented in FIG. 1.

FIG. 8 is a view which illustrates the relationship between the file to provisionally keep the intermediate data and the intermediate file, which are secured on the hard disc 9 shown in FIG. 1.

In FIG. 8, this file for provisional storage comprises a file to provisionally keep the page information that records the page information, and files to provisionally keep the intermediate data that record the intermediate data per page.

The file to provisionally keep the page information is stored when the head page and the new page are made in the step (7) and (14) shown in FIGS. 7A and 7B, respectively. This file records the current page number (page counter i) and the file name Pi of the file to provisionally keep the corresponding intermediate data os such page.

For example, in FIG. 8, the file name Pi is the file that records the first intermediate data. Also, the page counter i is updated per step of the page information recording, and the "i" is lastly recorded as "I" to indicate the total page number.

On the other hand, the file to provisionally keep the intermediate data is the region to store the intermediate data which represents the draw command converted into the other command form on it, and this region is created per page separated by the "new page command" or the like of the draw commands shown in FIG. 6.

Also, it may be possible to arrange the intermediate data in one form by putting the plural draw commands altogether or the like.

Now, with reference to FIG. 9 to FIG. 12, the description will be made of the intermediate data editing steps shown in the step (5) in FIG. 4.

Figure 9:
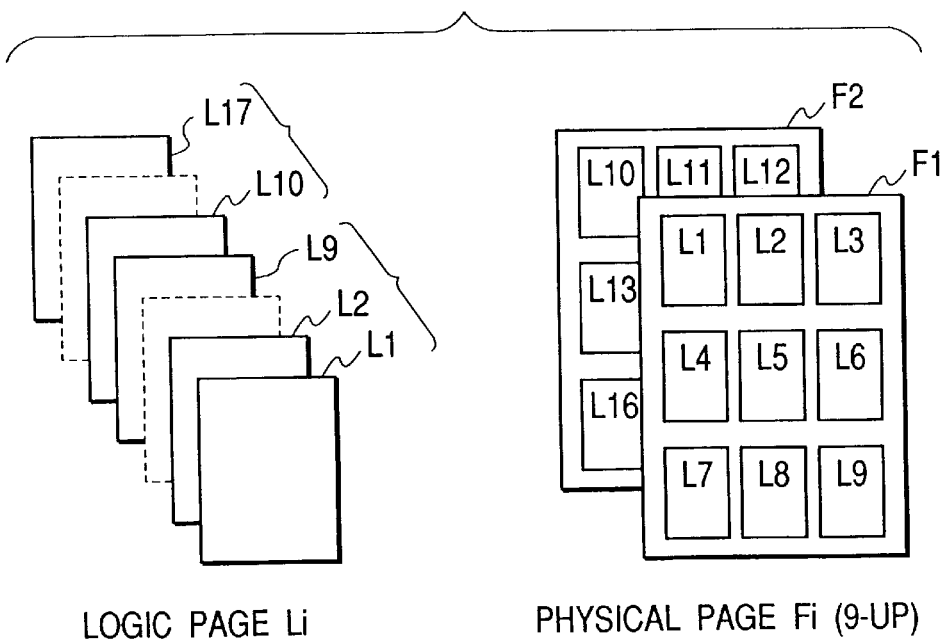
FIG. 9 is a view which illustrates one example of the function of the page layout print at the time of the intermediate data editing process shown in FIG. 4.

FIG. 9 is a view which illustrates one example of the function of the page layout print when the intermediate data is edited as shown in FIG. 4.

In FIG. 9, the reference marks L1 to L17 designate the logical pages Li. In accordance with this example, it is assumed that i=1 to 17, and shows the example of the output pages of 17.

Here, the reference marks F1 and F2 illustrate the pages that are actually output to a printer, that is, the physical pages Fi. The data of each page of the logical pages Li is reduced and allocated to one page of the physical pages and laid out accordingly.

Also, the reference mark N designates the number of the N-UP pages, that is, the page number of the logical pages which are laid out in one page of the physical pages. For this example, it is assumed that the N=9 (9-UP), and the 9-page portion of the logical pages is reduced to one page of the physical pages and laid out accordingly.

In this respect, the order of the layout is the "upper left, starting in the right direction" as exemplified in FIG. 9, and the logical page which is placed on the upper left is defined as the first page thereof, and given as L1. Thereafter, the L2 and L3 are arranged to the right. Then, the L4, L5 and on are to follow on the lower parts in that order. However, the layout order of the N-UP print function is not necessarily limited thereto. The order may be arranged in such a manner that it begins with the upper right to the lower part, and then, to the left columns or that it begins with upper left to the lower part, and then, to the right columns.

Also, the number N of the logical pages for the layout in one physical page is not necessarily limited to 9 pages (9-UP). The 2 pages (9-UP), 4 pages (4-UP), 8 pages (8-UP), 16 pages (16-UP) and the like are also possible as described earlier.

In this case, the page number I' of the physical pages Fi is expressed by the quotient of the (I/N). Further, given the number of the logical pages as 1 page (1-UP), it is then interpreted as the case where no page layout is executed. The one page portion is output in the same magnification as one page of the usual output.

Now, with reference to FIG. 8, the description will be made a little more of the page number of the intermediate data and the logical pages Li, as well as the physical pages Fi described earlier.

The intermediate data files shown in FIG. 8 are created in the order of the draw commands provided by the application shown in FIG. 6 accordingly, and the page numbers of the intermediate data files are in agreement with the page numbers output from the application. The logical page numbers Li are those of the page numbers of the intermediate data which are rearranged for the execution of the N-UP print function, and are in agreement with the page numbers of the intermediate data file.

For example, if the logical pages Li are reversely allocated to the LI to L1 for the page numbers 1 to I of the intermediate data file, and then, the layout of the physical page F1 is given as the N=1 (1-UP), the print is made in the order which is simply reversed. For the allocation of these logical pages and physical pages, various combinations are possible, and the layout style of the output page can be modified variously.

Now, with reference to FIGS. 10A and 10B, the description will be made of the page editing of the intermediate data edit process and each of the process procedures required for changing colors in the step (5) shown in FIG. 4.

Figures 10, 10A:
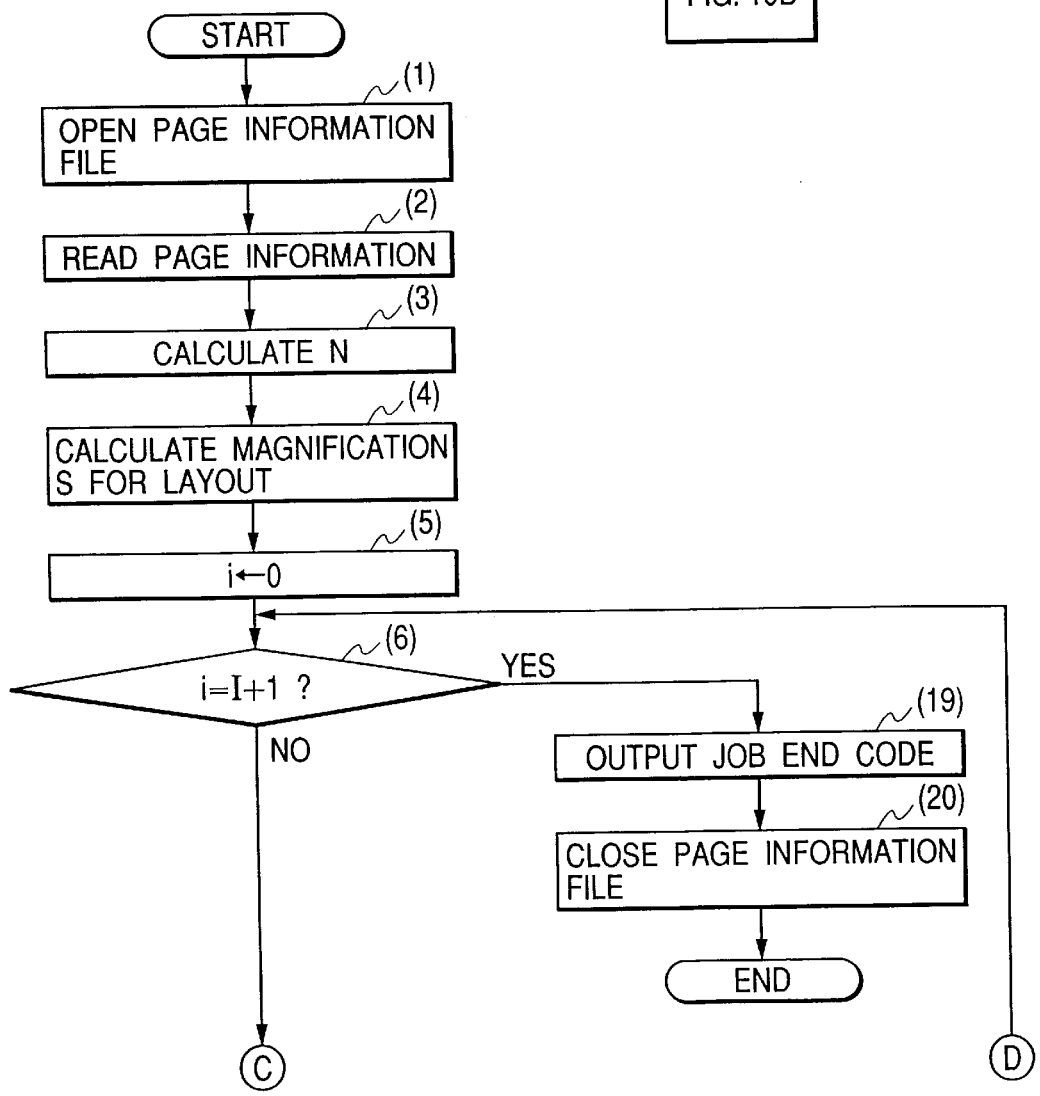
FIG. 10 is comprised of FIGS. 10A and 10B illustrating flowcharts which shows a third data process procedure for the data processing apparatus in accordance with the present invention.
Figure 10B:
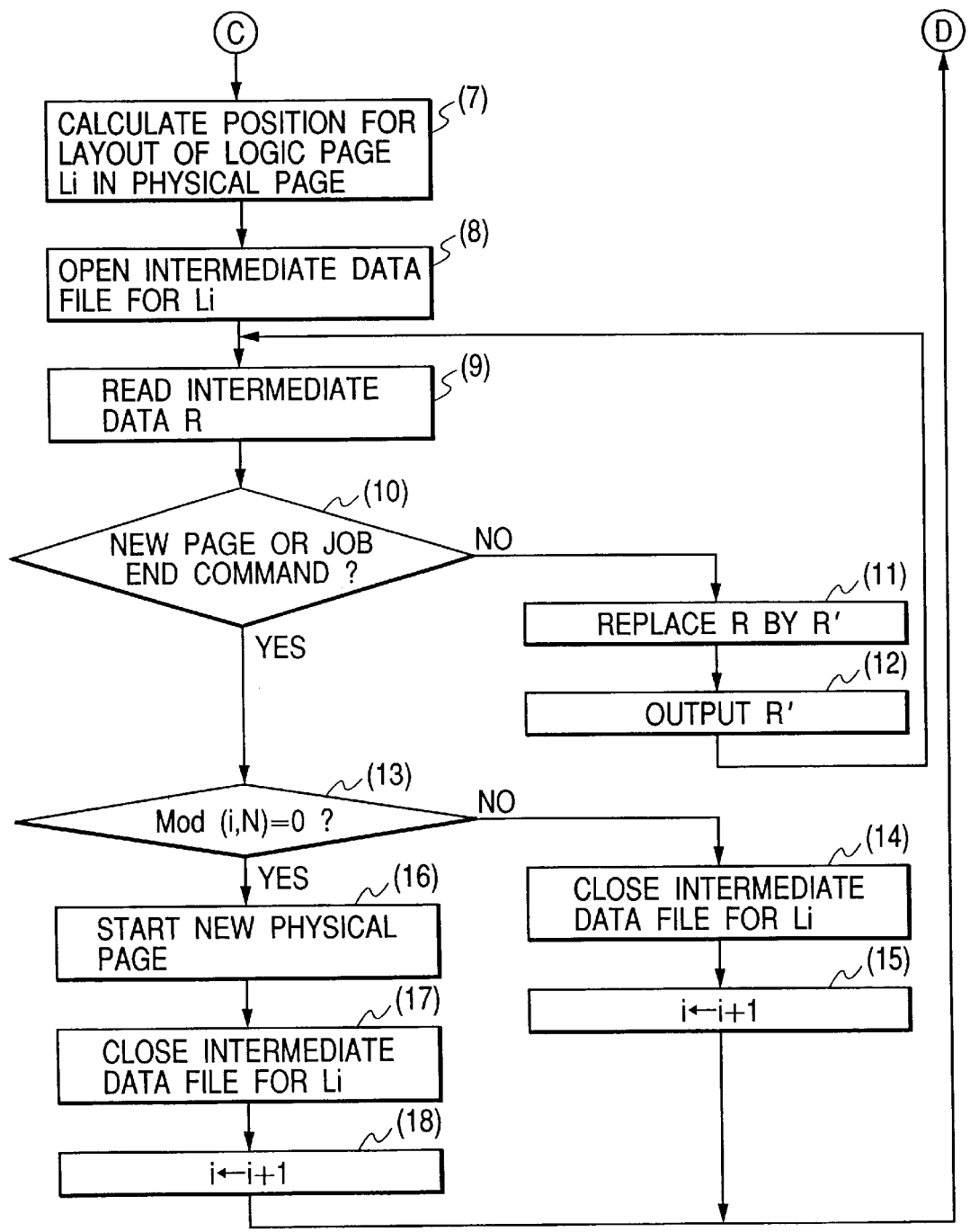

FIGS. 10A and 10B are flowcharts which shows one example of a third data process procedure for the data processing apparatus in accordance with the present invention, which corresponds to the intermediate data edit procedure of the present embodiment. In this respect, the reference numerals (1) to (16) designate each of the steps.

At first, in step (1), the provisionally kept page information file is open. Then, proceeding to step (2), the process reads the page information of the page information file.

Here, as described in conjunction with FIG. 8, the page information contains the total page number I, the file names Pi of the files that keep the intermediate data of each page, and some others.

Then, in step (3), the page number N is calculated afresh for the optimum page layout print of the N-UP print in accordance with the print mode set in the step (1) shown in FIG. 4.

Subsequently, proceeding to step (4), the process allocates the logical pages Li to the page numbers of the intermediate data described earlier as the layout setting, and calculates the reducing magnification S of each of the logical pages Li, which is needed when the layout is set for the physical pages. This allocation is set by the operator when he designates the print mode in the step (1) shown in FIG. 4, and the calculation is made on the basis thereof.

More specifically, as the example described in conjunction with FIG. 8, when the reverse order is designated, the logical pages Li are reversely allocated to the page numbers of the intermediate data files, among some others. Also, the reducing magnification S may be simply made S=⅓ if the N=9, for example, or may be made slightly smaller than S=⅓ in accordance with the N-UP page number N calculated in the step (3) as in the example described earlier in conjunction with FIG. 8.

Then, proceeding to step (5), the process initializes the page counter i to be set at "1" in order to count the logical pages Li. After that, in step (6), it is determined whether or not the page counter i indicates the i=I+1 for the total number I of the logical pages (the total number I of the logical pages should be in agreement with the page numbers of the intermediated data files). If it is found that i=I+1, the editing of all the intermediate files is assumed to be completed, and then, the process proceeds to step (19) where the "end code" is output lastly to the intermediate data file associated with the logical page LI to indicate the "end of job".

Subsequently, proceeding to step (20), the process closes the page information file to terminate the process.

On the other hand, if it is found in the step (6) that the i is not equal to I+1, the process proceeds to step (7) where the position (standard position) is calculated for the layout of the logical pages Li in the physical pages.

Now, for example, with the upper left coordinate of the logical page being a coordinate that indicates its position on the physical page, this standard position is determined in accordance with the page number N calculated in the step (3) at which the logical pages Li are laid out within one physical page, and the layout order, as well as the target logical page Li.

For the example of the physical page described in conjunction with FIG. 9, it may be possible to simply determine the horizontal coordinate x=the width of the physical page/3, and the vertical coordinate y=the height of the upper marginal portion with the current target logical page which is L2 if the upper left of the logical page is assumed to be the coordinate origin, because the N=9 (9-UP), and the layout is the "upper left, starting in the right direction".

Now, the process proceeds to step (8) to open the intermediate data file associated with the logical page Li. Then, in step (9), the records on the intermediate data are read sequentially and defined as R.

Then, in step (10), it is determined whether the intermediate data R read out in the step (9) is the "new page" or "job end". If the intermediate data R is not the "new page" or the "job end", the process proceeds to step (11) where the intermediate data R thus read is converted. Here, however, if no particular conversion is needed, the process may proceed to the next step as it is.

Then, proceeding to step (12), the process defines the intermediate data R converted in the step (11) as R', and edits and outputs it as the intermediate data file in accordance with the magnification S and the position calculated in the step (5), thus returning to the step (9) where the next records of the intermediate data are acquired afresh as the intermediate data R.

On the other hand, if the intermediate data R is found to be the "new page" or the "job end" in the step (10), the process proceeds to step (13) where it is determined whether or not Mod (1, N)=0 as if determining whether the "new page" of the physical page is made or not.

Here, the Mod (1, N) is the function that calculates the remainder of the current logical page counter i divided by the logical page numbers N which should be laid out in one page of the physical pages.

If it is determined that the Mod (1, N) is not equal to 0 in the step (13), the process proceeds to step (14) to close the intermediate data file associated with the logical page Li, which is currently open.

Then, in step (15), the logical page counter 1 is made i=i+1, and advanced by 1 page portion, thus the process returning to the step (6).

On the other hand, if it is found in the step (13) that the Mod (1, N)=0, the process proceeds to step (16) where the "new page" is executed for the physical pages.

In other words, the "new page" record is stored as the intermediate data at the end of the intermediate data file associated with the logical page Li, which is currently open.

Then, proceeding to step (17), the process closes the intermediate data file associated with the logical page Li, which has been in use. Then, in step (18), the logical page counter i is made i=i+1, and advanced by 1 page portion, thus the process returning to the step (6) to determine whether or not the process terminates.

Now, in conjunction with FIG. 11 and FIG. 12, the description will be made of the method for calculating the N-UP page numbers N in the step (3) shown in FIG. 10A.

Figure 11:
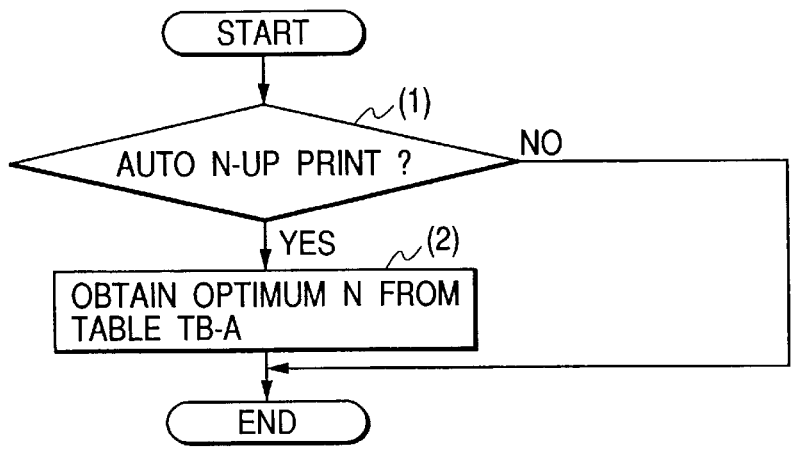
FIG. 11 is a flowchart which shows a fourth data process procedure for the data processing apparatus in accordance with the present invention.

FIG. 11 is a flowchart which shows one example of a fourth data process procedure for the data processing apparatus in accordance with the present invention. This flowchart corresponds to the detailed procedure in which the optimum N-UP page numbers N are calculated in accordance with the present embodiment. In this respect, the reference numerals (1), and (2) designate each of the steps. Also, it is assumed that the page number N for the N-UP print designated in the step (1) shown in FIG. 4 is set in advance as the initial value of the N before each of the steps are executed.

At first, in step (1), it is determined whether or not the automatic N-UP flag, which is designated in the step (1) shown in FIG. 4, is turned on. If negative, the N-UP page number remains unchanged as designated in the step (1) shown in FIG. 4, and the process terminates.

On the other hand, if the automatic N-UP flag is found to be turned on in the step (1), the process proceeds to step (2)

where the optimum N-UP page number N is calculated with reference to the table shown in FIG. 12. Then, the process terminates.

FIG. 12 is a view which shows one example of the table whereby to determine a first page number to be stored on the information processing apparatus represented in FIG. 1, which corresponds to the table TB-A for use of the calculation of the optimum N-UP page number.

For example, the optimum N is determined in accordance with the N-UP page number N designated in advance in the step (1) shown in FIG. 4, and the total page number I of the document data which is calculated as per the flowchart sown in FIGS. 7A and 7B.

More specifically, given the N-UP page number N designated in advance as the [2 (2-UP)], the optimum value of N is set at [1] if the total page number I is [1]. Also, if the total page number is two pages or more, the optimum value of N is set at [2].

Further, given the N-UP page numbers N designated in advance as [4 (4-UP)], the value of the optimum N-UP page N is [1] if the total page number I is [1] page, and the value of the optimum N-UP page N is [2] if the total page number is [2] pages, and the value of the optimum N-UP page number N is [4] if the total page number is [3] pages or more.

In this way, the value of the optimum N-UP page number N is determined afresh in accordance with the total page number I for all the cases of the values of the N-UP page numbers N designated in advance as "2, 4, 8, 9, and 16" in accordance with the table shown in FIG. 12.

Second Embodiment

Now, with reference to FIG. 13 and FIG. 14, the description will be made of a second embodiment in accordance with the present invention. In this respect, the fundamental structure and the process operation of the print process apparatus of the second embodiment are the same as those shown in FIG. 1 to FIG. 10B described for the first embodiment. The description will be made while referring to FIG. 1 to FIG. 10B appropriately.

In accordance with the present embodiment, the print process of the document data is designated with the application, and also, the N-UP print and the page numbers N which should be laid out on 1 page of the output sheet are designated as the print style, and further, the automatic N-UP print mode is designated. Also, at the same time, if a printer should be capable of executing the double-side print, the double-side print is designated.

After that, the program that writes the intermediate data converts the document data received from the application into the intermediate data, and provisionally keeps the intermediate data as an intermediate data file. Then, the total page number I of the logical pages is calculated. Further, the page information file is created with the page information recorded on it including the total page number thus calculated. Then, the intermediate data edit program reads out the page information file to calculate afresh the optimum N-UP page numbers N.

Here, when the print mode is N-UP, and the automatic N-UP mode is designated, and also, the double-side print mode is designated, the optimum N-UP is assumed to be the N=1 if the total page number I is 1 page or 2 pages, or the N=2 if the total page number I is 3 pages or more, provided that the 2-UP (N-2) is designated.

Also, when the 4-UP is designated, the N=[1] if the total page number I is [1] page or [2] pages; the N=[2] if the total page number I is [3] pages or [4] pages; or the N=[4] if the total page number I is [5] pages or more.

Further, when the 8-UP is designated, the N=[1] if the total page number I is [1] page or [2] pages; or the N=[2] if the total page number I is [3] pages or [4] pages; and the N=[4] if the total page number I is [5] pages or more up to [8] pages; the N=[8] if the total page number I is [9] pages or more.

Likewise, with the designated N as the maximum value, the optimum N is assumed to be the value that enables the total page number I to be laid out effectively as the physical pages in the case of the double-side print. Also, if there is no designation as to the double-side print, the optimum N value is assumed to be the value that can layout the total page number I on the physical pages effectively as in the first embodiment.

After that, the intermediate data edit program reads out each of the files that have provisionally kept the intermediate data, and processes the page layout in accordance with the N-UP page number N, hence processing the page layout print.

Subsequently, the intermediate data output program outputs the intermediate data to the printer control command generation program (printer driver) or outputs it to a program that resides in the pre-step thereof, and the printer control command generation program (printer driver) generates the printer control command (print data) lastly for the print performance.

What differs in the second embodiment from the first embodiment is only the method for calculating the optimum N-UP page numbers N in the step (3) shown in FIG. 10A. All the other processes are the same. Here, therefore, in conjunction with FIG. 13 and FIG. 14, the description will be made of the method for calculating the optimum N-UP page numbers N in the step (3) shown in FIG. 10A, but the description of the remaining processes will be omitted.

Figure 13:
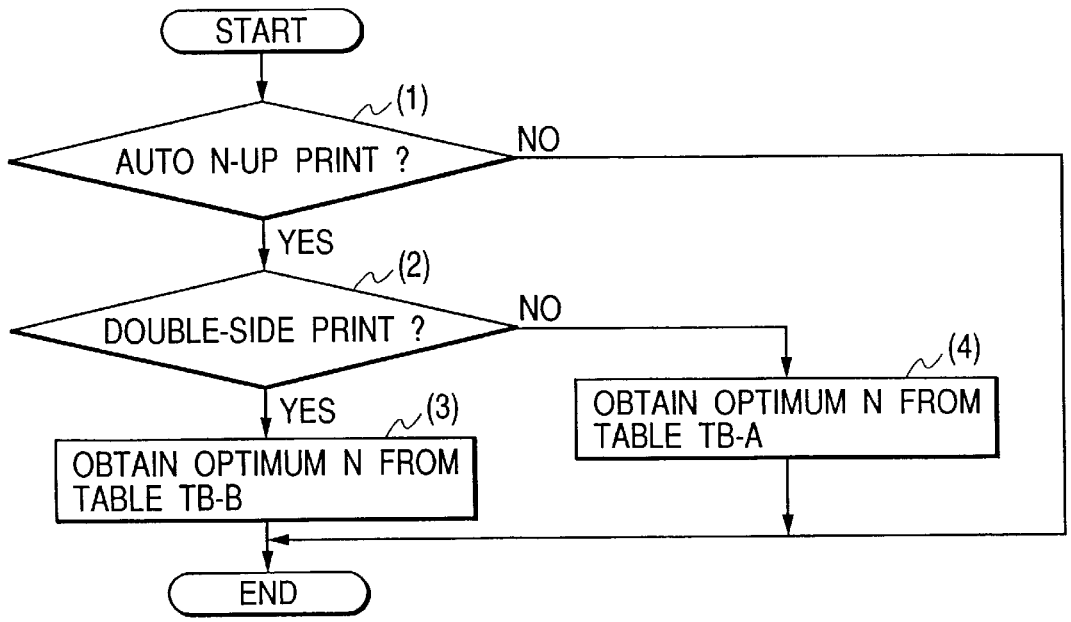
FIG. 13 is a flowchart which shows one example of a fifth data process procedure for the data processing apparatus in accordance with the present invention.

FIG. 13 is a flowchart which shows one example of a fifth data process procedure for the data processing apparatus in accordance with the present invention. This flowchart corresponds to the detailed procedure of the principal part required for calculating the optimum N-UP page numbers N in accordance with the present embodiment. In this respect, the numeral references (1) to (4) designate each of the steps. Also, it is assumed that the page number N of the N-UP print designated in the step (1) shown in FIG. 4 is set in advance as the initial value of the N-UP page number before each of the steps is executed.

At first, in step (1), it is determined whether or not the automatic N-UP flag, which is designated in the step (1) shown in FIG. 4, is turned on. If negative, the N-UP page number remains unchanged as designated in the step (1) shown in FIG. 4, and the process terminates.

On the other hand, if the automatic N-UP flag is found to be turned on in the step (1), the process proceeds to step (2) to determine whether or not the double-side print flag is turned on. If affirmative, the process proceeds to step (3) where the optimum N-UP page number N is calculated with reference to the table shown in FIG. 14 which will be described later. Then, the process terminates.

Meanwhile, in the step (2), if it is found that the double-side flag is turned off, the process proceeds to step (4). Then, as described for the first embodiment, the optimum N-UP page number N is calculated in accordance with the procedure shown in FIG. 11, while referring to the table TB-A shown in FIG. 12. Thus, the process terminates.

FIG. 14 is a view which shows one example of the table whereby to determine a second page number to be stored on the information processing apparatus shown in FIG. 1, which corresponds to the table TB-B for use of the calculation of the optimum N-UP page number when the double-side print is designated. The optimum N is determined in accordance with the step (1) shown in FIG. 4, the N-UP page number N designated in advance, and the total page number I of the document data calculated in the flowchart shown in FIGS. 7A and 7B.

For example, if the N-UP page number N designated in advance is given as the [2 (2-UP)], the optimum value of N is set at [1] if the total page number I is [1] or [2]. If the total page number is [3] pages or more, the optimum value of N is set at [2]. If the N-UP page number N designated in advance is [4 (4-UP)], the value of the optimum N is [1] when the total page number I is [1] page or [2].

Further, given the N-UP page numbers N designated in advance as [3] pages or [4] pages, the value of the optimum N-UP page N is [2], and the value of the optimum N-UP page N is [4] if the total page number is [5] pages or more.

In this way, when the double-side print is designated, the value of the optimum N-UP page number N is determined afresh in accordance with the total page number I for all the cases of the values of the N-UP page numbers N designated in advance as "2, 4, 8, 9, and 16" in accordance with the table TB-B shown in FIG. 13.

Third Embodiment

Now, in conjunction with FIG. 15, the description will be made of a third embodiment in accordance with the present invention. In this respect, the fundamental structure and the process operation of the print process apparatus of the third embodiment are the same as those shown in FIG. 1 to FIG. 11 described for the first embodiment. The description will be made while referring to FIG. 1 to FIG. 11 appropriately.

In accordance with the present embodiment, the print process of the document data is designated with the application, and also, the N-UP print and the page numbers N which should be laid out on 1 page of the output sheet are designated as the print style, and further, the automatic N-UP print mode is designated.

After that, the program that writes the intermediate data converts the document data received from the application into the intermediate data, and provisionally keeps the intermediate data as an intermediate data file. Then, the total page number I of the logical pages is calculated. Further, the page information file is created with the page information recorded on it including the total page number thus calculated.

Then, the intermediate data edit program reads out the page information file to calculate afresh the optimum N-UP page numbers N. Here, when the print mode is N-UP, and the automatic N-UP mode is designated, the optimum N is assumed to be the N=[1] if the total page number I is [1] page, the N=[2], if the total page number I is 2 pages, the N=[4] if the total page number I is [3] pages or [4] pages, or the N=[8] if the total page number I is [5] or more up to [8] pages.

Further, the optimum N is assumed to be the N=[18] if the total page number I is [9] pages, [17] pages, or [18] pages or the N=[16] if the total page number I is [10] pages or more, [16] pages or [19] pages or more.

In this way, the optimum N value for the present embodiment is the value which is calculated so as to minimize the number of the output sheets in accordance with the output pages, and to use the printable area of the sheet effectively.

After that, the intermediate data edit program reads out each of the files that have provisionally kept the intermediate data, and processes the page layout in accordance with the N-UP page number N, hence processing the page layout print.

Subsequently, the intermediate data output program outputs the intermediate data to the printer control command generation program (printer driver) or outputs it to a program that resides in the pre-step thereof, and the printer control command generation program (printer driver) generates the printer control command (print data) lastly for the print performance.

What differs in the third embodiment from the first embodiment is only the method for calculating the optimum N-UP page numbers N in the step (2) shown in FIG. 11. All the other processes are the same. Here, therefore, with reference to the table TB-C shown in FIG. 15, the description will be made of the method for calculating the optimum N-UP page numbers N in the step (2) shown in FIG. 11, but the description of the remaining processes will be omitted.

FIG. 15 is a view which shows one example of a third page number determination table stored in the data processing apparatus represented in FIG. 1, which is used for calculating the optimum N-UP page numbers, and corresponds to the case where the optimum N is determined in accordance with the total page number I of the document data each calculated in the flowchart shown in FIGS. 7A and 7B.

In FIG. 15, it is assumed that the N=[1] if the total page number I is [1] page, the N=2, the total page number I is [2] pages, the N=[4] if the total page number I is [3] pages or [4] pages, or the N=[8] if the total page number I is [5] pages or more up to [8] pages.

Further, it is assumed that the N=[9] if the total page number is [9] pages, [17] pages, or [18] pages, or the N=[16] if the total pages I is [10] pages or more or [19] pages or more.

In this way, the optimum N value is determined by each of the total page numbers I in accordance with the table TA-C shown in FIG. 15.

Forth Embodiment

Now, in conjunction with FIG. 16, the description will be made of a fourth embodiment in accordance with the present invention. In this respect, the fundamental structure and the process operation of the print process apparatus of the fourth embodiment are the same as those shown in FIG. 1 to FIG. 10B described for the first embodiment and in FIG. 13 for the second embodiment. The description will be made while referring to FIG. 1 to FIG. 10B and FIG. 13 appropriately.

In accordance with the present embodiment, the print process of the document data is designated with the application, and also, the N-UP print and the page numbers N which should be laid out on 1 page of the output sheet are designated as the print style, and further, the automatic N-UP print mode is designated.

Also, at the same time, the double-side print is designated if a printer should be capable of performing the double-side print. After that, the program that writes the intermediate data converts the document data received from the application into the intermediate data, and provisionally keeps the intermediate data as an intermediate data file. Then, the total page number I of the logical pages is calculated. Further, the page information file is created with the page information recorded on it including the total page number thus calculated.

Then, the intermediate data edit program reads out the page information file to calculate afresh the optimum N-UP page numbers N. Here, when the print mode is N-UP, and the automatic N-UP mode is designated, and also, the double-side print is designated, the optimum N is assumed to be the N=[1] if the total page number I is [1] page or [2] pages, the N=[2], if the total page number I is [3] pages or [4] pages, the N=[4] if the total page number I is [5] pages or more up to [8] pages.

Further, the optimum N is assumed to be the N=[9] if the total page number I is [9] pages, [17] pages, [18] pages or [33] pages or more up to [36] pages, the N=[8] if the total page number I is [10] pares or more up to [16] pages, or the N=[16] if the total page number I is [19] pages or more up to [32] pages or [37] pages or more.

In this way, the optimum N value for the present embodiment is the value which is calculated so as to minimize the number of the output sheets in accordance with the output pages, and to use the printable area of the sheet effectively.

After that, the intermediate data edit program reads out each of the files that have provisionally kept the intermediate data, and processes the page layout in accordance with the N-UP page number N, hence processing the page layout print.

Subsequently, the intermediate data output program outputs the intermediate data to the printer control command generation program (printer driver) or outputs it to a program that resides in the pre-step thereof, and the printer control command generation program (printer driver) generates the printer control command (print data) lastly for the print performance.

What differs in the fourth embodiment from the second embodiment is only the method for calculating the optimum N-UP page numbers N in the step (3) shown in FIG. 13. All the other processes are the same. Here, therefore, with reference to the table TB-D shown in FIG. 16, the description will be made of the method for calculating the optimum N-UP page numbers N in the step (3) shown in FIG. 13, but the description of the remaining processes will be omitted.

FIG. 16 is a view which shows one example of a fourth page number determination table stored in the data processing apparatus represented in FIG. 1, which is used for calculating the optimum N-UP page numbers, and corresponds to the case where the optimum N is determined in accordance with the total page number I of the document data each calculated in the flowchart shown in FIGS. 7A and 7B.

In FIG. 16, it is assumed that the N=[1] if the total page number I is [1] page or [2] pages, the N=[2], the total page number I is [3] pages or [4] pages, or the N=[4] if the total page number I is [5] pages or more up to [8] pages.

Further, it is assumed that the N=[9] if the total page number is [9] pages or [17] pages, or [18] pages, or [33] pages or more up to [36] pages, or the N =[8] if the total page number I is [10] pages or more up to [16], or the N [16] if the total pages I is [19] pages or more up to [32] pages or [37] pages or more.

In this way, when the double-side print is designated, the optimum N value is determined by each of the total page numbers in accordance with the table TB-D shown in FIG. 16.

Now, hereunder, with reference to the memory map shown in FIG. 17, the description will be made of the structure of the data process program readable by the print system to which the data processing apparatus of the present invention is applicable.

FIG. 17 is a view which illustrates the memory map of the storage medium that stores various data process programs readable by the print system to which the data processing apparatus of the present invention is applicable.

Here, although not particularly shown in FIG. 17, there may be stored the information that manages the program group to be stored on the storage medium, such as the version information, producers of the corresponding programs, and also, the information which depends on the OS or the like on side which reads out the corresponding programs, such as the icon or the like that identifies a program.

Further, the data that belongs to each of the various programs is also under the management of the respective directories. Also, there are stored the program which is used for installing each of the programs on the computer, and the program which is used for defrosting or the like for the installation of a compressed program.

It may be possible to arrange the structure so that a host computer executes each of the functions embodying the present invention shown in FIG. 4, FIG. 7A, FIG. 7B, FIG. 10A, FIG. 10B, FIG. 11, and FIG. 13 by use of the respective programs installed on it from the outside. In such case, the information group that contains the programs may be supplied from the output devices, such as the CD-ROM, the flash memory, the FD, and some other storage medium or the external storage media through the network. Then, the present invention is also applicable.

As described above, the storage medium that records the program codes of the software that implements the functions embodying the present invention is provided for the system or the apparatus, and then, the computer (or the CPU or MPU) of such system or apparatus reads out the program codes thus stored on the storage medium for the execution of the functions. In this case, too, it is of course possible to achieve the objects of the present invention.

In this case, the program codes read out from the storage medium implements the new functions of the present invention. Therefore, it is construed that the storage medium which stores such program codes constitutes the present invention.

As the storage medium that supplies the program codes, it may be possible to use a floppy disc, a hard disc, an optical disc, an opto-magnetic disc, a CD-ROM, a CD-R, a magnetic tape, a non-volatile memory card, a ROM, an EEPROM, among some others.

Also, not only the program codes are read out by the computer for the execution thereof to implement the functions embodying the present invention, but the operating system (OS) or the like that operates on the computer executes partly or totally the actual processes in accordance with the commands given by such program codes for the implementation of the functions embodying the present invention. It is of course construed that this case is within the scope of the present invention.

Further, the program codes read out from the storage medium are written on the expanded functional board inserted into the computer or written on the memory provided for the expanded functional unit connected with the computer, and then, the CPU or the like provided for such expanded functional board or the expanded functional unit executes partly or totally the actual processes in accordance with the instructions made by such program codes, hence implementing the functions embodying the present invention by the execution of such processes. It is of course construed that this case is within the scope of the present invention.

In accordance with each of the above described embodiments, it is anticipated to demonstrate the effect that makes it possible to execute the N-UP print process in a good style by use of the printer which is provided with the function to print per page unit, and the system formed by the information processing apparatus, such as a personal computer connected with the aforesaid printer, using the print processing method and apparatus, as well as the storage medium described above. Further, for the print process of the information processing apparatus, the intermediate data is generated in the data form which is different from the print data before the print data which should be transmitted to the printer is generated, and then, the intermediate data is provisionally kept hence making it possible for the print process system to generate the print data from the aforesaid intermediate data. In this system, the print mode is designated, and when the intermediate data is generated and kept provisionally, the page information of the print data to be transmitted is recorded, thus executing the layout print control of the intermediate data provisionally kept in accordance with the print mode and the page information as well. Then, the intermediate data is output after the execution of the page editing. With the intermediate data thus output, the last print data is generated and output. In this way, the number of operations required for the appropriate instructions of the page layout is curtailed to save the number of output sheets or to utilize the printable area of each output sheet effectively.

Also, when the print mode is designated, the page layout print mode and the page numbers which should be laid out within one page are designated. Therefore, it becomes possible to curtail the number of operations required for the appropriate page layout instructions, hence saving the number of the output sheets or utilizing the printable area of each output sheet effectively. Hence it is anticipated to demonstrate the effect that enables the N-UP print to be executed in a good style.

Also, when the print mode is designated, it is possible to designate the print mode of whether or not the calculation is made to determine automatically the page numbers which should be laid out within one page at the time of designating the page layout print mode. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the print mode is designated, it is possible to designate the double-side print mode if the printer is capable of executing the double-side print. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the page information is recorded, it is possible to count the total page number of the print data. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to execute the page layout print process if the mode is to make the page layout print with the designation of the print data. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to define the page number which should be laid out in one page as 1 page without depending on the designated page numbers if the total page number of the print data is 1 page, provided that the mode is designated to calculate the page numbers to be laid out in one page automatically. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to define the page number which should be laid out in one page as 1 page without depending on the designated page numbers if the total page number of the print data is 1 page or 2 pages, provided that the mode is designated to calculate the page numbers to be laid out in one page automatically. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to automatically calculate the page number which should be laid out in one page in accordance with the total page number of the print data, while defining the designated page number as its maximum for the effective arrangement of each page of the print data on the output sheet, provided that the mode is designated to calculate the page numbers to be laid out in one page automatically, and also, the double-side print is designated. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to automatically calculate the page number which should be laid out in one page in accordance with the total page number of the print data, while defining the designated page number as its maximum for the effective arrangement of each page of the print data on both sides of the output sheet, provided that the mode is designated to calculate the page numbers to be laid out in one page automatically, and also, the double-side print is designated. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, when the intermediate data is edited, it is possible to automatically calculate the page number which should be laid out in one page in accordance with the total page number of the print data for the proper arrangement of each page of the print data on 1 page of the output sheet, not depending on the designated page numbers, provided that the mode is designated to calculate the page numbers to be laid out in one page automatically, and also, the double-side print is designated. Therefore, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, since the print mode designation and the print instruction are made, respectively, by use of the keyboard, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

Also, since the print mode designation and the print instruction are made, respectively, by use of the pointing device, it becomes possible to curtail the number of operations required for the appropriate page layout instructions, hence saving the number of the output sheets or utilizing the printable area of each sheet effectively. It is then anticipated to demonstrate the effect that enables the N-UP print process to be executed in a good style.

As described above, according to the first aspect of the present invention, a data processing apparatus, which is capable of generating the intermediate data in the form different from the print data before generating the print data to be transmitted to a print apparatus through a specific communication medium, provisionally keeping the intermediate data, and generating the print data from the intermediate data, comprises means for recording page information to record the logical page information for the print data to be transmitted to the print apparatus when the intermediate data is generated; means for editing intermediate data to edit the intermediate data having a predetermined page layout number or the page number different from the layout page number in accordance with the print mode designated by means for designating print mode and the logical page information recorded in the means for recording page information; and output means to generate the print data analyzable by the print apparatus in accordance with the output intermediate data edited per page by the means for editing intermediate data, and to output the data to the print apparatus. Therefore, it is possible to generate the output intermediate data, which can layout the optimum page number, depending on the page numbers of the print data designated for printing, and to avoid automatically the print process of any improper style having the excessive margin due to a smaller number of logical pages in the print data, without any particular preventive operation even when the layout print is designated at the time of executing the print process.

According to the second aspect of the present invention, the means for designating print mode designates the page layout print mode and the page number to be laid out in one page. Therefore, it is possible to generate the output intermediate data which can layout the optimum page number depending on the page numbers of the print data designated for printing, and automatically avoid the print process of any improper style having an excessive margin due to a smaller number of logical pages in the print data, without any particular operation even when the page numbers are designated for the layout on one page at the time of executing the print process.

According to the third aspect of the present invention, the means for designating print mode designates the print mode of whether or not the page number to be laid out in one page is automatically calculated when the page layout print mode is designated. Therefore, it is possible to automatically avoid the print process of any improper style having the excessive margin due to a smaller number of logical pages in the print data, without any particular operation even when the page numbers are automatically calculated for the layout on one page at the time of executing the print process.

According to the fourth aspect of the present invention, the print apparatus comprises the double-side print function, and the means for designating print mode is able to designate the double-side print for the print apparatus. Therefore, it is possible to automatically avoid the print process of any improper style having the excessive margin due to a smaller number of logical pages in the print data, without any particular operation even when the layout print is designated at the time of executing the double-side print process.

According to the fifth aspect of the present invention, the means for recording page information counts the total page number of the print data, and records the logical page information of the print data to be transmitted to the print apparatus. Therefore, it is possible to grasp the logical page numbers exactly, and generate the output intermediate data for the layout of the optimum page number depending on the page numbers of the print data designated for printing.

According to the sixth aspect of the present invention, the means for editing intermediate data performs the page edit accompanied by the reduced page layout when the page layout print mode is designated by the means for designating print data. Therefore, it is possible to avoid any page layout that may produce the improper style even if curtailing the sheets to be used.

According to the seventh aspect of the present invention, the means for editing intermediate data performs the page edit to layout the intermediate data having a portion of page numbers different from the designated page number when the mode is designated to automatically calculate the page number to be laid out in one page. Therefore, it is possible to avoid automatically the print process of any improper style having the excessive margin due to a smaller number of logical pages in the print data, without any particular operation even when the page numbers are automatically calculated for the layout on one page at the time of executing the print process.

According to the eighth aspect of the present invention, the means for editing intermediate data performs the page edit to layout the intermediate data having a portion of page numbers different from the designated page number when the mode is designated to automatically calculate the page number to be laid out in one page and the double-side print is designated. Therefore, it is possible to avoid automatically the print process of any improper style having the excessive margin due to a smaller number of logical pages in the print data, without any particular operation even when the page numbers are automatically calculated for the layout on one page at the time of executing the print process.

According to the ninth aspect of the present invention, the means for editing intermediate data performs the automatic calculation of page number to be laid out in one page in accordance with the total page number of the print data, while defining the designated page number as maximum, for the effective arrangement of each page of the print data on an output sheet when the mode is designated to automatically calculate the page number to be laid out in one page. Therefore, it is possible to avoid automatically the print process of any improper style having the excessive margin due to a smaller number of logical pages in the print data, without any particular operation even when the page numbers are automatically calculated for the layout on one page with the designated page numbers as maximum at the time of executing the print process.

According to the tenth aspect of the present invention, the means for editing intermediate data performs the automatic calculation of page number to be laid out in one page in accordance with the total page number of the print data, while defining the designated page number as maximum, for the effective arrangement of each page of the print data on the double-side of an output sheet when the mode is designated to automatically calculate the page number to be laid out in one page and the double-side print is designated. Therefore, it is possible to avoid automatically the print process of any improper style having the excessive margin due to a smaller number of logical pages in the print data, without any particular operation even when the page numbers are automatically calculated for the layout on one page with the designated page numbers as maximum at the time of executing the print process.

According to the eleventh aspect of the present invention, the means for editing intermediate data performs the automatic calculation of page number to be laid out in one page in accordance with the total page number of the print data, not depending on the designated page number, for the proper arrangement of each page of the print data within one page of an output sheet when the mode is designated to automatically calculate the page number to be laid out in one page. Therefore, it is possible to calculate automatically the page numbers for the layout on one page in accordance with the total page number of the print data, not depending on the designated page numbers, and make the layout so as to arrange the print data on one page as much as possible, hence saving the consumption of the output sheets significantly.

According to the twelfth aspect of the present invention, the means for editing intermediate data performs the automatic calculation of page number to be laid out in one page in accordance with the total page number of the print data, not depending on the designated page number, for the proper arrangement of each page of the print data on the double-side of an output sheet when the mode is designated to automatically calculate the page number to be laid out in one page and the double-side print is designated. Therefore, it is possible to calculate automatically the page numbers for the layout on one page in accordance with the total page number of the print data, not depending on the designated page numbers, and make the layout so as to arrange the print data on the double-side of one page as much as possible, hence saving the consumption of the output sheets significantly.

According to the thirteenth and fourteenth aspects of the present invention, the print mode designation is made by a specific input unit. As a result, it becomes possible to designate the print mode with a simple operation using the pointing device or the keyboard of the data processing apparatus.

According to the fifteenth aspect of the present invention, the means for editing intermediate data begins editing pages when the execution of the print process is instructed in accordance with the print mode designated by the means for designating print mode. Therefore, it is possible to settle the optimum pages to be output on one page when the designated print mode is made definite.

According to the sixteenth and thirty-fist aspects of the present invention, a method for processing print data for the data processing apparatus, which is capable of generating the intermediate data in the form different from the print data before generating the print data to be transmitted to a print apparatus through a specific communication medium, provisionally keeping the intermediate data in a memory source, and generating the print data from the intermediate data per unit of page, comprises the following steps of: recording page information to record the logical page information for the print data to be transmitted to the print apparatus in the memory source when the intermediate data is generated and kept provisionally; editing intermediate data to edit the intermediate data having a predetermined page layout number or the page number different from the layout page number in accordance with the print mode designated in the step of designating print mode and the logical page information recorded in the step of recording page information; and generating the print data analyzable by the print apparatus in accordance with the output intermediate data edited per page in the step of editing intermediate data, and outputting the data to the print apparatus. Therefore, it is possible to generate the output intermediate data which can layout the optimum page number depending on the page numbers of the print data designated for printing, and automatically avoid the print process of any improper style having an excessive margin due to a smaller number of logical pages in the print data, without any particular operation even when the page numbers are designated for the layout on one page at the time of executing the print process.

According to the seventeenth and thirty-second aspects of the present invention, the step of designating print mode is for the designation of the page layout print mode and the page number to be laid out in one page. Therefore, it is possible to automatically avoid the print process of any improper style having an excessive margin due to a smaller number of logical pages in the print data, without any particular operation even when the page numbers are designated for the layout on one page at the time of executing the print process.

According to the eighteenth and thirty-third aspects of the present invention, the step of designating print mode is for the designation of the print mode of whether or not the page number to be laid out in one page is automatically calculated when the page layout print mode is designated. Therefore, it is possible to automatically avoid the print process of any improper style having an excessive margin due to a smaller number of logical pages in the print data, without any particular operation even when the page numbers are automatically calculated for the layout on one page at the time of executing the print process.

According to the nineteenth and thirty-fourth aspects of the present invention, the print apparatus comprises the double-side print function, and the step of designating print mode is for the designation of the double-side print for the print apparatus. Therefore, it is possible to automatically avoid the print process of any improper style having an excessive margin due to a smaller number of logical pages in the print data, without any particular operation even when the layout print is designated at the time of executing the double-side print process.

According to the twentieth and thirty-five aspects of the present invention, the step of recording page information is for counting the total page number of the print data, and recording the logical page information of the print data to be transmitted to the print apparatus. Therefore, it is possible to grasp the logical page numbers exactly, and generate the output intermediate data for the layout of the optimum page number depending on the page numbers of the print data designated for printing.

According to the twenty-first and thirty-sixth aspects of the present invention, the step of editing intermediate data is for the performance of the page editing accompanied by the reduced page layout when the page layout print mode is designated in the step of designating print data. Therefore, it is possible to avoid any page layout that may produce the improper style even if curtailing the sheets to be used.

According to the twenty-second and thirty-seventh aspects of the present invention, the step of editing intermediate data is for the performance of the page edit to layout the intermediate data having a portion of page numbers different from the designated page number when the mode is designated to automatically calculate the page number to be laid out in one page. Therefore, it is possible to avoid automatically the print process of any improper style having the excessive margin due to a smaller number of logical pages in the print data, without any particular operation even when the page numbers are automatically calculated for the layout on one page at the time of executing the print process.

According to the twenty-third and thirty-eighth aspects of the present invention, the step of editing intermediate data is for the performance of the page edit to layout the intermediate data having a portion of page numbers different from the designated page number when the mode is designated to automatically calculate the page number to be laid out in one page and the double-side print is designated. Therefore, it is possible to avoid automatically the print process of any improper style having the excessive margin due to a smaller number of logical pages in the print data, without any particular operation even when the page numbers are automatically calculated for the layout on one page at the time of executing the print process.

According to the twenty-fourth and thirty-ninth aspects of the present invention, the step of editing intermediate data is for the performance of the automatic calculation of page number to be laid out in one page in accordance with the total page number of the print data, while defining the designated page number as maximum, for the effective arrangement of each page of the print data on an output sheet when the mode is designated to automatically calculate the page number to be laid out in one page. Therefore, it is possible to avoid automatically the print process of any improper style having the excessive margin due to a smaller number of logical pages in the print data, without any particular operation even when the page numbers are automatically calculated for the layout on one page with the designated page numbers as maximum at the time of executing the print process.

According to the twenty-fifth and fortieth aspects of the present invention, the step of editing intermediate data is for the performance of the automatic calculation of page number to be laid out in one page in accordance with the total page number of the print data, while defining the designated page number as maximum, for the effective arrangement of each page of the print data on the double-side of an output sheet when the mode is designated to automatically calculate the page number to be laid out in one page and the double-side print is designated. Therefore, it is possible to avoid automatically the print process of any improper style having the excessive margin due to a smaller number of logical pages in the print data, without any particular operation even when the page numbers are automatically calculated for the layout on one page with the designated page numbers as maximum at the time of executing the double-side print process.

According to a twenty-sixth and forty-first aspects of the present invention, the step of editing intermediate data is for the performance of the automatic calculation of page number to be laid out in one page in accordance with the total page number of the print data, not depending on the designated page number, for the proper arrangement of each page of the print data within one page of an output sheet when the mode is designated to automatically calculate the page number to be laid out in one page. Therefore, it is possible to arrange the print data for the layout on one page as much as possible, and curtail the consumption of output sheets significantly.

According to the twenty-seventh and forty-second aspects of the present invention, the step of editing intermediate data is for the performance of the automatic calculation of page number to be laid out in one page in accordance with the total page number of the print data, not depending on the designated page number, for the proper arrangement of each page of the print data on the double-side of an output sheet when the mode is designated to automatically calculate the page number to be laid out in one page and the double-side print is designated. Therefore, it is possible to arrange the print data for the layout on the double-side of one page as much as possible, and curtail the consumption of output sheets significantly.

According to the twenty-eighth, forty-third, twenty-ninth, and forty-fourth aspects of the present invention, the print mode designation is made by a specific input unit. Therefore, it is possible to designate the print mode by the simple operation using the pointing device or keyboard of the data processing apparatus.

According to a thirtieth and forty-fifth aspects of the present invention, the means for editing intermediate data begins editing pages when the execution of the print process is instructed in accordance with the print mode designated by the step of designating print mode. Therefore, it is possible to settle the optimum pages to be output on one page when the designated print mode is made definite.

As described above, it is possible to generate the output intermediate data which can layout the optimum page numbers depending on the page numbers of the designated print data. Therefore, when the print process is executed, it becomes possible to avoid automatically any print process of improper style having the excessive margin due to a smaller number of logical pages in the print data, without any particular preventive operation even when the layout print is designated. At the same time, it becomes possible to demonstrate the effect to curtail the consumption of output sheets significantly.

What is claimed is:

1. A data processing apparatus which transmits print data to a print apparatus through a specific communication medium, said data processing apparatus being capable of generating intermediate data different in data form from the print data before generating the print data, provisionally retaining the intermediate data, and generating the print data from the intermediate data, said data processing apparatus comprising:

recording means for recording logical page information for the print data to be transmitted to the print apparatus when the intermediate data is generated and provisionally retained;

editing means for editing the intermediate data having a predetermined page layout number or a page number different from the layout page number in accordance with a print mode designated by print mode designating means and the logical page information recorded by said recording means; and output means for generating the print data analyzable by the print apparatus in accordance with the intermediate data edited by said editing means, and outputting the generated print data to the print apparatus.

2. A data processing apparatus according to claim 1, wherein said print mode designating means designates a page layout print mode and the page number to be laid out in one page.

3. A data processing apparatus according to claim 1, wherein said print mode designating means designates the print mode of whether or not the page number to be laid out in one page is automatically calculated when a page layout print mode is designated.

4. A data processing apparatus according to claim 1, wherein said print apparatus comprises a double-side print function, and said print mode designating means is able to designate the double-side print for said print apparatus.

5. A data processing apparatus according to claim 1, wherein said recording means counts a total page number of said print data, and records the logical page information of the print data to be transmitted to said print apparatus.

6. A data processing apparatus according to claim 1, wherein said editing means performs a page edit accompanied by a reduced page layout when the page layout print mode is designated by said print mode designating means.

7. A data processing apparatus according to claim 1, wherein said editing means performs a page edit to layout the intermediate data having a portion of page numbers different from a designated page number when said print mode designating means designates a mode to automatically calculate the page number to be laid out in one page.

8. A data processing apparatus according to claim 1, wherein said editing means performs a page edit to layout the intermediate data having a portion of page numbers different from a designated page number when said print mode designating means designates a mode to automatically calculate the page number to be laid out in one page and a double-side print is designated.

9. A data processing apparatus according to claim 1, wherein said editing means performs an automatic calculation of page number to be laid out in one page in accordance with a total page number of the print data, while defining a designated page number as maximum, for an effective arrangement of each page of the print data on an output sheet when said print mode designating means designates a mode to automatically calculate a page number to be laid out in one page.

10. A data processing apparatus according to claim 1, wherein said editing means performs an automatic calculation of page number to be laid out in one page in accordance with a total page number of the print data, while defining a designated page number as maximum, for a effective arrangement of each page of the print data on a double-side of an output sheet when said print mode designating means designates a mode to automatically calculate a page number to be laid out in one page and a double-side print is designated.

11. A data processing apparatus according to claim 1, wherein said editing means performs an automatic calculation of page number to be laid out in one page in accordance with a total page number of the print data, not depending on a designated page number, for a proper arrangement of each page of the print data within one page of an output sheet when said print mode designating means designates a mode to automatically calculate the page number to be laid out in one page.

12. A data processing apparatus according to claim 1, wherein said editing means performs an automatic calculation of page number to be laid out in one page in accordance with a total page number of the print data, not depending on the designated page number, for a proper arrangement of each page of the print data on a double-side of an output sheet when said print mode designating means designates a mode to automatically calculate the page number to be laid out in one page and a double-side print is designated.

13. A data processing apparatus according to claim 1, wherein said print mode designation is made by a specific input unit.

14. A data processing apparatus according to claim 13, wherein said input unit is a pointing device or a keyboard.

15. A data processing apparatus according to claim 1, wherein said editing means begins editing pages when an execution of the print process is instructed in accordance with a print mode designated by said print mode designating means.

16. A data processing method for processing print data for a data processing apparatus which transmits print data to a print apparatus through a specific communication medium, said data processing apparatus being capable of generating an intermediate data different in data form from the print data before generating the print data, provisionally retaining the intermediate data in a memory source, and generating the print data from the intermediate data per unit of a page, comprising the following steps of:

recording logical page information for the print data to be transmitted to the print apparatus in said memory source when said intermediate data is generated and kept provisionally;

editing the intermediate data having a predetermined page layout number or a page number different from the page layout number in accordance with a designated print mode and the logical page information recorded by said step of recording page information; and generating the print data analyzable by said print apparatus in accordance with the intermediate data edited in said step of editing intermediate data, and outputting data to the print apparatus.

17. A data processing method for processing print data for a data processing apparatus according to claim 16, wherein in the designated print mode, a page layout print mode and the page number are laid out in one page.

18. A data processing method for processing print data for a data processing apparatus according to claim 16, wherein the designated print mode designates whether or not the page number laid out in one page is automatically calculated when a page layout print mode is designated.

19. A data processing method for processing print data for a data processing apparatus according to claim 16, wherein said print apparatus comprises a double-side print function, and the designated print mode designates a double-side print for said print apparatus.

20. A data processing method for processing print data for a data processing apparatus according to claim 16, wherein said step of recording page information is for counting a total page number of said print data, and recording the logical page information of the print data to be transmitted to said print apparatus.

21. A data processing method for processing print data for a data processing apparatus according to claim 16, wherein said step of editing intermediate data is for a performance of a page editing accompanied by a reduced page layout when a page layout print mode is designated.

22. A data processing method for processing print data for a data processing apparatus according to claim 16, wherein said step of editing intermediate data is for a performance of a page edit to layout the intermediate data having a portion of page numbers different from a designated page number when said designated print mode designates to automatically calculate the page number to be laid out in one page.

23. A data processing method for processing print data for a data processing apparatus according to claim 16, wherein said step of editing intermediate data is for a performance of a page edit to layout the intermediate data having a portion of page numbers different from a designated page number when said designated print mode designates to automatically calculate the page number to be laid out in one page and a double-side print is designated.

24. A data processing method for processing print data for a data processing apparatus according to claim 16, wherein said step of editing intermediate data is for a performance of an automatic calculation of page number to be laid out in one page in accordance with a total page number of the print data, while defining a designated page number as maximum, for an effective arrangement of each page of the print data on an output sheet when said designated print mode designates to automatically calculate the page number to be laid out in one page.

25. A data processing method for processing print data for a data processing apparatus according to claim 16, wherein said step of editing intermediate data is for a performance of an automatic calculation of page number to be laid out in one page in accordance with a total page number of the print data, while defining a designated page number as maximum, for an effective arrangement of each page of the print data on a double-side of an output sheet when said designated print mode designates to automatically calculate the page number to be laid out in one page and a double-side print is designated.

26. A data processing method for processing print data for a data processing apparatus according to claim 16, wherein said step of editing intermediate data is for the performance of an automatic calculation of page number to be laid out in one page in accordance with a total page number of the print data, not depending on a designated page number, for a proper arrangement of each page of the print data within one page of an output sheet when said designated print mode designates to automatically calculate the page number to be laid out in one page.

27. A data processing method for processing print data for a data processing apparatus according to claim 16, wherein said step of editing intermediate data is for a performance of an automatic calculation of page number to be laid out in one page in accordance with a total page number of the print data, not depending on a designated page number, for a proper arrangement of each page of the print data on a double-side of an output sheet when said designated print mode designates to automatically calculate the page number to be laid out in one page and a double-side print is designated.

28. A data processing method for processing print data for a data processing apparatus according to claim 16, wherein said designated print mode is designated by a specific input unit.

29. A data processing method for processing print data for a data processing apparatus according to claim 28, wherein said input unit is a pointing device or a keyboard.

30. A data processing method for processing print data for a data processing apparatus according to claim 16, wherein said editing step begins editing pages when an execution of the print process is instructed in accordance with the designated print mode.

31. A computer-executable program for controlling a data processing apparatus which transmits print data to a print apparatus through a specific communication medium, said data processing apparatus being capable of generating the intermediate data different in data form from the print data before generating the print data, provisionally retaining the intermediate data in a memory source, and generating the print data from the intermediate data per unit of a page, said program comprising:
  recording code to record a logical page information for the print data to be transmitted to said print apparatus in said memory source when said intermediate data is generated and provisionally retained;
  editing code to edit the intermediate data having a predetermined page layout number or a page number different from the page layout number in accordance with a designated print mode and the logical page information recorded by said recording code; and
  generating code to generate the print data analyzable by said print apparatus in accordance with the intermediate data edited by said editing code, and outputting said data to said print apparatus.

32. A computer program according to claim 31, wherein said designated print mode is for a designation of a page layout print mode and the page number to be laid out in one page.

33. A computer program according to claim 31, wherein said designated print mode is for a designation of whether or not a page number to be laid out in one page is automatically calculated when a page layout print mode is designated.

34. A computer program according to claim 31, wherein said print apparatus comprises a double-side print function, and said designated print mode is for the designation of a double-side print for said print apparatus.

35. A computer program according to claim 31, wherein said recording code counts a total page number of said print data, and records the logical page information of the print data to be transmitted to said print apparatus.

36. A computer program according to claim 31, wherein said editing code performs a page editing accompanied by a reduced page layout when a page layout print mode is designated.

37. A computer program according to claim 31, wherein said editing code performs a page edit to layout the intermediate data having a portion of page numbers different from a designated page number when said designated print mode is designated to automatically calculate the page number to be laid out in one page.

38. A computer program according to claim 31, wherein said editing code performs a page edit to layout the intermediate data having a portion of page numbers different from a designated page number when said designated print mode is designated to automatically calculate the page number to be laid out in one page and a double-side print is designated.

39. A computer program according to claim 31, wherein said editing code performs an automatic calculation of page number to be laid out in one page in accordance with a total page number of the print data, while defining a designated page number as maximum, for an effective arrangement of each page of the print data on an output sheet when said designated print mode is designated to automatically calculate the page number to be laid out in one page.

40. A computer program according to claim 31, wherein said editing code performs an automatic calculation of page number to be laid out in one page in accordance with a total page number of the print data, while defining a designated page number as maximum, for an effective arrangement of each page of the print data on a double-side of an output sheet when said designated print mode is designated to automatically calculate the page number to be laid out in one page and a double-side print is designated.

41. A computer program according to claim 31, wherein said editing code performs an automatic calculation of page number to be laid out in one page in accordance with a total page number of the print data, not depending on a designated page number, for a proper arrangement of each page of the print data within one page of an output sheet when said designated print mode is designated to automatically calculate the page number to be laid out in one page.

42. A computer program according to claim 31, wherein said editing code performs an automatic calculation of page number to be laid out in one page in accordance with a total page number of the print data, not depending on a designated page number, for a proper arrangement of each page of the print data on a double-side of an output sheet when said designated print mode is designated to automatically calculate the page number to be laid out in one page and a double-side print is designated.

43. A computer program according to claim 31, wherein said designated print mode is designated by a specific input unit.

44. A computer program according to claim 43, wherein said input unit is a pointing device or a keyboard.

45. A computer program according to claim 31, wherein said editing codes begins editing pages when an execution of a print process is instructed in accordance with the designated print mode.

46. A data processing apparatus according to claim 1, wherein a layout process of a designated number of pages is not executed if a total page number of the print data is one page and the page number to be laid out in one page is designated two or more.

47. A method according to claim 16, wherein in said editing step, a layout process of a designated number of pages is not executed if a total page number of the print data is one page and the page number to be laid out in one page is designated two or more.

48. A computer program according to claim 31, wherein in said editing code, a layout process of a designated number of pages is not executed if a total page number of the print data is one page and the page number to be laid out in one page is designated two or more.

* * * * *

UNITED STATES PATENT AND TRADEMARK OFFICE
CERTIFICATE OF CORRECTION

PATENT NO. : 6,757,073 B1
DATED : June 29, 2004
INVENTOR(S) : Shigeki Kuroda

It is certified that error appears in the above-identified patent and that said Letters Patent is hereby corrected as shown below:

Column 8,
Lines 16 and 28, "shows" should read -- show --.

Column 9,
Line 4, "such a" should read -- such as a --; and
Line 50, "bid" should read -- bit --.

Column 10,
Line 40, "confirm" should read -- confirms --.

Column 12,
Line 66, "is" should be deleted.

Column 13,
Line 37, "designate" should read -- designates --.

Column 14,
Line 4, "figure" should read -- "figure -- ;
Line 26, "7B flowcharts which shows" should read -- 7B flowcharts show --;
Line 33, "numeral" should read -- numerals --;
Line 43, "proceed" should read -- proceeds --; and
Line 61, " "ne" should read -- "new --.

Column 15,
Lines 12, 14 and 20, "proceed" should read -- proceeds --;
Line 23, "to-step" should read -- to step --; and
Line 46, "os" should read -- of --.

Column 18,
Line 55, "numerals (1)," should read -- numerals (1) --.

Column 19,
Line 12, "sown" whould read -- shown --.

Column 21,
Line 55, "N=[2]," should read -- N=[2] --.

UNITED STATES PATENT AND TRADEMARK OFFICE
CERTIFICATE OF CORRECTION

PATENT NO. : 6,757,073 B1
DATED : June 29, 2004
INVENTOR(S) : Shigeki Kuroda

It is certified that error appears in the above-identified patent and that said Letters Patent is hereby corrected as shown below:

Column 22,
Line 30, "N=2, the" should read -- N=[2] if the --; and
Line 42, "Forth" should read -- Fourth --.

Column 23,
Line 7, "N=[2]," should read -- N=[2] --;
Line 12, "[33] pages" should read -- [33] pages --;
Line 13, "pares" should read -- pages --; and
Line 49, "N=[2], the" should read -- N=[2] is the --.

Column 24,
Line 10, "like on side" should read -- like, --; and
Line 17, "defrosting" should read -- decompressing --.

Column 25,
Line 14, "kept" should read -- kept, --.

Column 29,
Line 66, "thirty-fist" should read -- thirty-first --.

Column 30,
Line 60, "thirty-five" should read -- thirty-fifth --.

Column 33,
Line 53, "a" should read -- an --.

UNITED STATES PATENT AND TRADEMARK OFFICE
CERTIFICATE OF CORRECTION

PATENT NO. : 6,757,073 B1
DATED : June 29, 2004
INVENTOR(S) : Shigeki Kuroda

It is certified that error appears in the above-identified patent and that said Letters Patent is hereby corrected as shown below:

Column 38,
Line 4, "codes" should read -- code --.

Signed and Sealed this

Twelfth Day of October, 2004

JON W. DUDAS
*Director of the United States Patent and Trademark Office*